US009285635B2

(12) United States Patent
Robinson et al.

(10) Patent No.: US 9,285,635 B2
(45) Date of Patent: Mar. 15, 2016

(54) STEREOSCOPIC FLAT PANEL DISPLAY WITH UPDATED BLANKING INTERVALS

(75) Inventors: Michael G. Robinson, Boulder, CO (US); Jianmin Chen, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 426 days.

(21) Appl. No.: 12/853,274

(22) Filed: Aug. 9, 2010

(65) Prior Publication Data

US 2011/0032439 A1 Feb. 10, 2011

Related U.S. Application Data

(60) Provisional application No. 61/232,346, filed on Aug. 7, 2009.

(51) Int. Cl.
*G02F 1/1335* (2006.01)
*G02B 27/22* (2006.01)
*H04N 13/04* (2006.01)

(52) U.S. Cl.
CPC ...... *G02F 1/133621* (2013.01); *G02B 27/2214* (2013.01); *H04N 13/0404* (2013.01); *H04N 13/0434* (2013.01); *H04N 13/0438* (2013.01); *G02F 2001/133622* (2013.01)

(58) Field of Classification Search
CPC .......... H04N 13/0438; H04N 13/0434; H04N 13/0404; G02F 1/133621; G02F 2001/133622; G02B 27/2214
See application file for complete search history.

(56) References Cited

U.S. PATENT DOCUMENTS

| 4,281,341 | A | 7/1981 | Byatt |
| 5,991,074 | A | 11/1999 | Nose et al. |
| 6,774,977 | B1 | 8/2004 | Walton et al. |
| 6,975,345 | B1 | 12/2005 | Lipton et al. |
| 7,528,906 | B2 | 5/2009 | Robinson |
| 2002/0075202 | A1 | 6/2002 | Fergason |
| 2006/0002064 | A1 | 1/2006 | Oooka et al. |
| 2006/0072006 | A1* | 4/2006 | Lin et al. .......... 348/51 |
| 2006/0098285 | A1 | 5/2006 | Woodgate et al. |
| 2006/0203338 | A1 | 9/2006 | Pezzaniti |
| 2007/0008406 | A1 | 1/2007 | Shestak et al. |

(Continued)

FOREIGN PATENT DOCUMENTS

| EP | 860730 A2 | 8/1998 |
| EP | 1742492 A2 | 1/2007 |

(Continued)

OTHER PUBLICATIONS

Lin et al., "Surface Polarity Controlled Horizontal Chevron Defect Free Surface Stabilized Ferroelectric Liquid Crystal Devices," pp. 1003-1005, SID 09 Digest (2009).

(Continued)

*Primary Examiner* — Dennis Y Kim

(74) *Attorney, Agent, or Firm* — Neil G. J. Mothew

(57) ABSTRACT

This disclosure describes stereoscopic flat panel display systems based on the polarization encoding of sequentially displayed left and right eye images. The systems comprise line-by-line addressed liquid crystal display (LCD) panels, illuminating back light units and polarization control panels (PCPs). Right and left eye images are written sequentially onto the LCD whose polarization is controlled by a substantially synchronously driven PCP. The backlight may be continuously illuminated, or modulated temporally, spatially or both, as can the PCP.

20 Claims, 20 Drawing Sheets

(56) References Cited

U.S. PATENT DOCUMENTS

| | | | |
|---|---|---|---|
| 2007/0035672 A1 | 2/2007 | Shestak et al. | |
| 2007/0126691 A1 | 6/2007 | Lin et al. | |
| 2007/0195163 A1* | 8/2007 | Chestak et al. | 348/58 |
| 2008/0136762 A1 | 6/2008 | Fergason | |
| 2008/0211736 A1 | 9/2008 | Taira et al. | |
| 2008/0218459 A1 | 9/2008 | Kim et al. | |
| 2008/0239176 A1* | 10/2008 | Shestak et al. | 349/15 |
| 2008/0266388 A1 | 10/2008 | Woodgate | |
| 2008/0291152 A1* | 11/2008 | Nakao et al. | 345/102 |
| 2008/0297671 A1* | 12/2008 | Cha et al. | 349/15 |
| 2008/0316303 A1 | 12/2008 | Chiu et al. | |
| 2009/0102990 A1 | 4/2009 | Walton et al. | |
| 2009/0153754 A1 | 6/2009 | Jung | |
| 2009/0224646 A1 | 9/2009 | Kim et al. | |
| 2010/0066820 A1* | 3/2010 | Park et al. | 348/53 |
| 2010/0091227 A1* | 4/2010 | Chen et al. | 349/122 |

FOREIGN PATENT DOCUMENTS

| | | |
|---|---|---|
| GB | 2354833 A | 9/1999 |
| JP | H7-301779 | 11/1995 |
| JP | H8-15641 | 1/1996 |
| JP | 2001154640 A | 6/2001 |
| JP | 2002101427 A | 4/2002 |
| JP | 2003-202519 | 7/2003 |
| JP | 2005-77437 A | 3/2005 |
| JP | 2007-72217 A | 3/2007 |
| KR | 102007006553 A | 1/2007 |
| KR | 100677637 B1 | 2/2007 |
| KR | 1020080024901 A | 3/2008 |
| KR | 1020090018528 A1 | 2/2009 |
| KR | 1020100023613 A1 | 3/2010 |

OTHER PUBLICATIONS

Kikuchi et al., "Optically Isotropic Nano-structured Liquid Crystal Composites for Display Applications," Digest of Technical Papers, pp. 578-581, SID 09 Digest (2009).

Suzuki et al., "Crosstalk-Free 3D Display with Time-Sequential OCB LCD," pp. 428-431, SID 09 Digest (2009).

International Search Report and written opinion of international searching authority in co-pending PCT/US10/44934 dated Feb. 25, 2011.

PCT Notification of Transmittal of International Preliminary Report on Patentability patent application No. PCT/US10/44934 dated Apr. 9, 2012 and the International Preliminary Report on Patentability patent application No. PCT/US10/44934 dated Mar. 7, 2012.

International Search Report and Written Opinion of PCT/US10/044933 dated Feb. 25, 2011.

International Preliminary Report on Patentability of PCT/US10/044933 dated Feb. 7, 2012.

Extended European Search Report for co-pending EP application No. 12194887.1, mailed Aug. 4, 2014.

\* cited by examiner

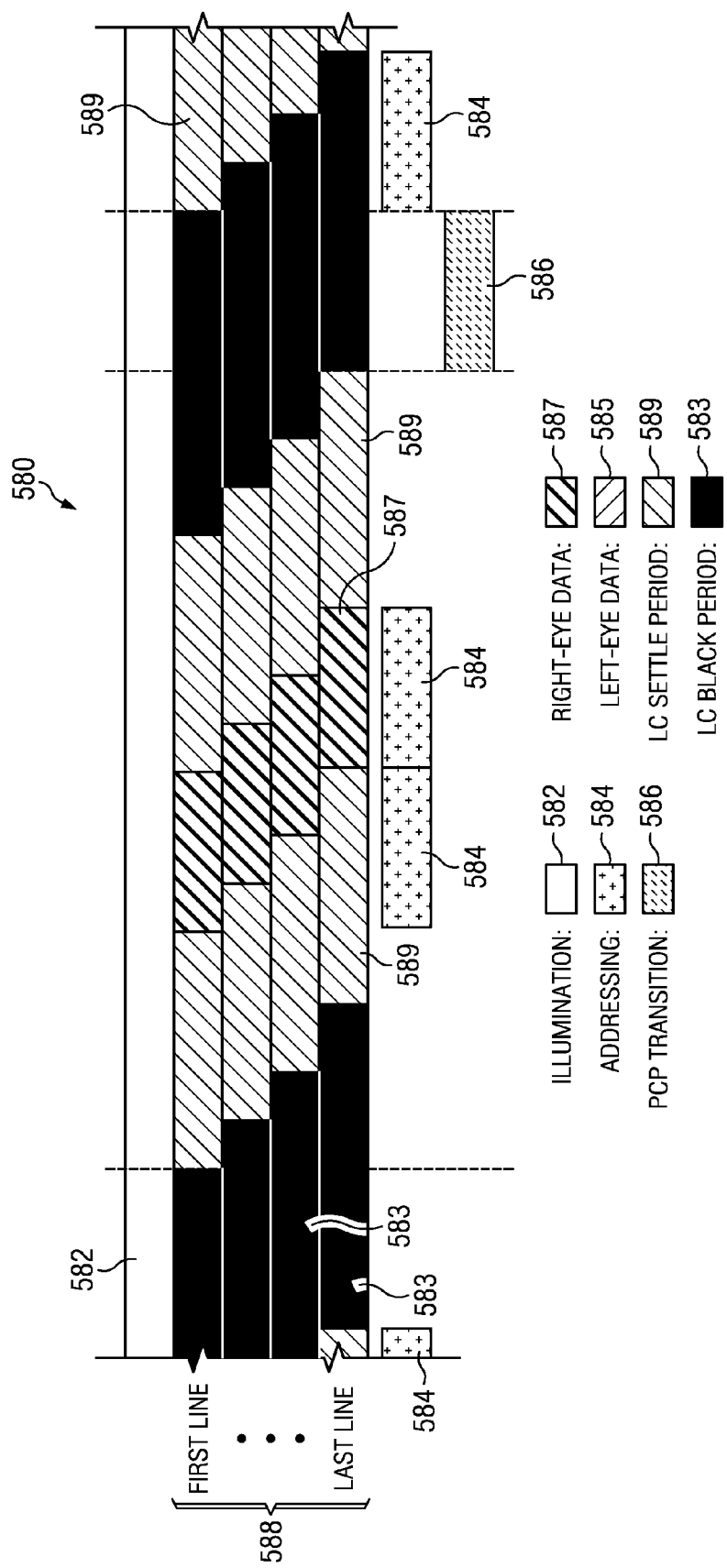

STEREOSCOPIC FLAT PANEL DISPLAY WITH UPDATED BLANKING INTERVALS

CROSS-REFERENCE TO RELATED APPLICATIONS

This application claims priority to U.S. Prov. Patent Application Ser. No. 61/232,346, filed Aug. 7, 2009, entitled "Liquid crystal three dimensional display," the entirety of which is incorporated herein by reference. It should be noted that this application is being filed on Monday Aug. 9, 2010, which is the first business day following the one year anniversary of Aug. 7, 2009, pursuant to MPEP §710.05.

TECHNICAL FIELD

This disclosure generally relates to displays, and more specifically relates to stereoscopic flat panel displays having a backlight, a liquid crystal (LC) modulation panel, and a polarization control panel (PCP).

BACKGROUND

Stereoscopic projection dates back to the early $20^{th}$ century and was first seen in cinemas during the 1950s. Polarization control of alternate left and right eye displayed images is the preferred method for 3D cinema. In a 3D cinema, a fast projector flashes the left and right eye frames at a rate imperceptible to the human visual system. In synchronization, a fast liquid crystal modulator positioned between a projection lens and a polarization preserving screen encodes different polarization states onto the two frame sets. The audience wears glasses that can select between the different polarization states providing the different left- and right-eye views used for stereoscopic 3D. The use of a single projector is both cost effective and more robust to operation when compared to the alternative two projector approach. With separate projectors, periodic re-alignment is used, with adjustment to ensure matching of left- and right-eye image brightness and color.

The use of a single, fast, direct view TV-like display with a polarization modulator would benefit from the same advantages. This fact has already been recognized and exploited in the form of the commercially available monitor Z-Screen by RealD Inc. The polarization control panel (PCP) in the monitor Z-screen is a segmented pi-cell driven in synchronization with a naturally scrolling cathode ray tube (CRT) display. See, e.g., U.S. Pat. No. 4,281,341 to Byatt. Specific drive methods are disclosed in commonly-owned U.S. Pat. No. 6,975,345 to Lipton et al.

BRIEF DESCRIPTION OF THE DRAWINGS

FIG. 5C is a schematic diagram illustrating showing an alternative timing sequence of the system shown in FIG. 5A;

BRIEF SUMMARY

Figure 1:
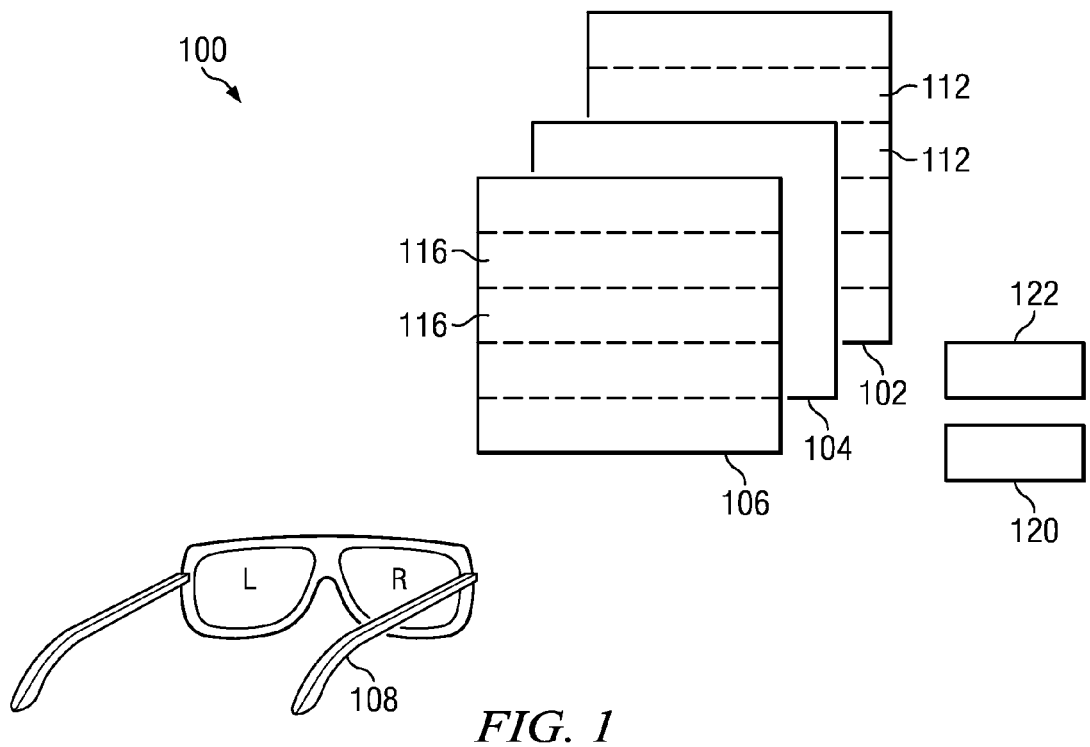
FIG. 1 is a schematic conceptual diagram illustrating an exemplary stereoscopic flat panel display system, in accordance with the present disclosure.

A stereoscopic flat panel display, a method for displaying data on a stereoscopic flat panel display, and a controller for controlling a stereoscopic flat panel display are provided. The display has a backlight, a liquid crystal (LC) modulation panel, and a polarization control panel (PCP). The backlight may selectively provide light to the LC modulation panel or may be continuously lit. The LC modulation panel is positioned to receive the light incident from the backlight. The LC modulation panel may modulate the light incident from the backlight. The PCP is positioned to receive the modulated light incident from the LC modulation panel. The PCP may selectively transform the state of polarization (SOP) of the modulated light incident from the LC modulation panel in synchronization with the backlight and LC modulation panel.

According to an aspect, the display has a presentation state and a transition state. In the presentation state, the backlight provides light to the LC modulation panel and the PCP operates either a right-eye polarization mode or a left-eye polarization mode. When the PCP operates in the left-eye polarization mode the LC modulation panel operates in a left-eye image mode. When the PCP operates in the right-eye polarization mode, the LC modulation panel operates in a right-eye image mode. In the transition state, the backlight does not provide light to the LC modulation panel when the LC modulation panel changes between the left-eye and right-eye image modes and when the PCP transitions between the left-eye and the right-eye polarization modes.

According to another aspect, the display has a perspective view state, a first LC transition state, a PCP transition state, and a second LC transition state. In the first LC transition state, the PCP is operating in either a right-eye polarization mode or left-eye polarization mode. When the PCP operates in the left-eye polarization mode the LC modulation panel operates in a left-eye image mode. When the PCP operates in the right-eye polarization mode the LC modulation panel operates in a right-eye image mode. IN the first LC transition state, the PCP is operating in either the right-eye polarization mode or left-eye polarization mode and the LC modulation panel is changing from either the right-eye or left-eye image mode to substantially black image content. In the PCP transition state, the PCP transitions between the left-eye and the right-eye polarization modes and the LC modulation panel presents substantially black image content. In the second LC transition state, the PCP is operating in either the left-eye or the right-eye polarization mode, and the LC modulation panel is changing from substantially black image content to either the right-eye or left-eye image mode.

According to another aspect, in the PCP transition state, the backlight is not providing light.

According to another aspect, for a short period prior to the PCP transition state and for a short period after the PCP transition state, the backlight is not providing light.

According to another aspect, during the first LC transition state, a top portion of the backlight is turned off before a bottom portion of the backlight is turned off; and during the PCP transition state, the top and bottom portions of the backlight are turned off; and during the second LC transition state, the top portion of the backlight is turned on before the bottom portion of the backlight is turned on According to another aspect, a controller for the stereoscopic flat patent display has a backlight interface, an LC interface, and a PCP interface. The backlight interface may provide a backlight control signal to the backlight. The LC interface may provide an LC control signal to the LC modulation panel. The PCP interface may provide a PCP control signal to the PCP.

These and other advantages of the present disclosure will become apparent to those skilled in the art from the following detailed description, the accompanying drawings, and the appended claims.

DETAILED DESCRIPTION

To address the aforementioned shortcomings, a polarization control panel (PCP) LCD combination system (hereinafter, stereoscopic flat panel display system) is proposed within this disclosure. Stereoscopic flat panel display systems would have advantages of increased efficiency over the superseded cathode ray tube (CRT) equivalent by virtue of the already polarized display output of the LC display, as LC displays typically emit linearly polarized light. Stereoscopic flat panel display systems also have a distinct advantage over the active shutter-glass systems proposed by others, e.g., Nvidia® 3d Vision™, as viewers may use low cost, lightweight, reliable passive eyewear. Stereoscopic flat panel display systems may use a large polarization modulating or polarization control panel (PCP), which typically operates with a horizontal segment-by-segment scrolling update or a global update, that is synchronized with the line-by-line update of LC displays.

LCs in flat panel displays are typically slower than the modulation panels used in projectors. Typical LC materials use milliseconds to return to an un-driven state. It is possible to introduce faster LC modes and materials such as ferroelectric (as discussed by Lin et al. in *Surface Polarity Controlled Horizontal Chevron Defect Free Surface Stabilized Ferroelectric Liquid Crystal Devices*, 1003●SID 09 DIGEST), blue phase (as discussed by Kikuchi et al. in *Optically Isotropic Nano-structured Liquid Crystal Composites for Display Applications*, p. 578) or pi-mode (as discussed by Suzuki et al. in *Crosstalk-Free 3D Display with Time-Sequential OCB LCD*, 428●SID 09 DIGEST), but conventional slower mode LCs are the mainstay of current LC displays for their reliability and tolerance (all references in this paragraph herein incorporated by reference). Normally black modes may also be used with larger form factor TVs providing better viewing angle performance. The application of a drive voltage may be used to turn pixels bright resulting in a faster transition than the un-driven relaxation white to black. Stereoscopic displays should ensure minimal mixing between left and right eye images, which relies on a fast transition to black. The normally-white twisted nematic LC modes (more common to smaller screen sized monitors) are also an option. These modes are described by way of illustration (though other modes may also be used) in the system approaches described herein.

The slower black to white transitions of normally white panels (and even slower grey to grey) may compromise the performance of system. Overdriving methods with voltage drive levels based on previous LC states help to provide correct sequential stereoscopic images. These approaches are covered in detail in the commonly-owned U.S. Pat. App. No. 2008/0316303-A1 to Chiu et al. (hereinafter Chiu et al.) and are incorporated herein by reference for all purposes.

Disclosed herein are a series of system embodiments relating to the DC balancing the LCD panels within these systems and a method for suppressing the visibility of PCP segment boundaries.

This disclosure also covers a stereoscopic liquid crystal display system comprising a conventional line-by-line addressed LCD, an optionally spatially controllable backlight unit (BLU), and an optionally segmented PCP. The combination of a spatially controllable BLU and PCP is discussed by Chiu et al., which is herein incorporated by reference for all purposes.

FIG. 1 is a schematic conceptual diagram illustrating an exemplary stereoscopic flat panel display system 100. The system 100 may include a backlight 102, an LC modulation panel 104, and a polarization control panel (PCP) 106. The system 100 may also include a controller 122 providing control interfaces and/or instructions for controlling the backlight 102, LC modulation panel 104, and PCP 106. The controller 122 may be in communication with a source 120. The source 120 may include a DVD or blu ray player, cable signal, internet signal, or any other signal capable of providing image data to the system 100.

The backlight 102 may selectively illuminate the stereoscopic flat panel display system 100. The LC panel 104 may modulate the light incident from the backlight 102. The PCP 106 may alter the state of the modulated light incident from the LC panel 104. The PCP 106 may selectively transform the state of polarization (SOP) of the modulated light from the LC panel 104 in synchronization with the LC panel update and backlight illumination.

In an embodiment, the PCP 106 may be a segmented PCP having a plurality of polarization control segments 116. In another embodiment, the PCP may be a non-segmented, globally addressed PCP. Thus, the PCP 106 may be addressed either globally or segment-by-segment.

In an embodiment, the backlight 102 may be a spatially controllable backlight having a plurality of illuminating backlight portions 112. In another embodiment, the backlight 102 may be a globally selectively illuminated backlight. In still another embodiment, the backlight 102 may be globally (but not selectively) illuminated backlight. Thus, the backlight may illuminate portion-by-portion (e.g., a spatially controllable backlight), may be selectively illuminated (i.e., selectively turned on or off), or may be illuminated when the system is on (i.e., always illuminated when the system's power is on).

The LC panel 104 may show image content associated with a right- or left-eye view whose polarization is affected by the PCP 106. The right- and left-eye views may be displayed sequentially on the LC panel 104 and, thus, at times, while the LC panel 104 is being updated, the LC panel 104 may show portions of both the right- and left-eye views. The PCP 106 and/or the backlight 102 may be driven in synchronization to provide different polarization states for the displayed images.

Each of a viewer's eyes would see one of the images by wearing polarization selective eyewear 108, each lens of which would act to block the light of the incorrect image. In general, the eyewear 108 may comprise any polarization analyzing form just so long as it achromatically blocks the polarization state of the undesired image. Most commonly, circularly polarized eyewear comprising a polarizer and single quarter wave retarder is used, to be consistent with the current cinema eyewear.

In an embodiment, the stereoscopic flat panel display system 100 may be operated time-sequentially at a rate in excess of the eye's flicker frequency threshold of about 50 frames per second. In some embodiments, acceptable performance is achieved at 60 Hz per eye—resulting in the system 100 displaying images at 120 Hz.

Figure 2:
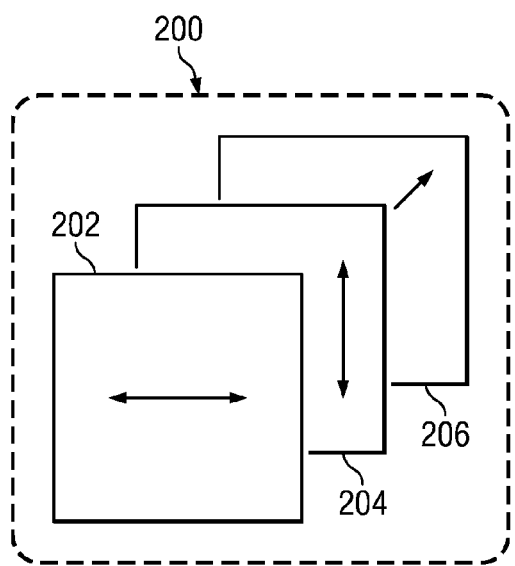
FIG. 2 is a schematic diagram illustrating an exemplary polarization control panel (PCP), in accordance with the present disclosure.

FIG. 2 is a schematic diagram illustrating an exemplary PCP 200 employing a single liquid crystal modulation element 204. In this example, the PCP 200 may include a polarizer 206, a zero to half-wave retardation modulator or switch panel 204, and a quarter wave plate retarder 202. Here, the zero twist LC zero to half-wave retardation modulator 204 is oriented at 45 degrees to an output polarization direction of modulated light from an LC modulation panel. The fixed quarter wave retarder 202 is oriented at 90 degrees to the PCP 200 axis of orientation, and located in the output light path the PCP 200 to allow modulation between opposite quarter wave retardation states (i.e., left- and right-handed circularly polarized light).

This exemplary PCP 200 configuration may be preferred over two crossed LC cells, like the approach used in cinemas, since it offers significant cost advantages. The zero twisted retardation modulator 204 is capable of imparting two retardation levels separated by a half-wave. The first retardance state of the modulator 204 is preferably close to zero retardation. Laminated to this cell is the quarter wave retarder 202 having effectively quarter-wave retardance oriented at ninety degrees. The combination of the modulator 204 and the fixed retarder 202 switches polarized light between substantially orthogonal circularly polarized states. This exemplary PCP 200 allows for a system that can use passive eyewear (as used in the cinema) with reasonable performance. Improved performance may mean further manipulation of the input polarization state and reorientation of modulator elements not shown here for the sake of clarity. More complex direct view stereoscopic display systems, such as those with biaxial retarders may also be considered for improved off-axis viewing performance. See, for example, those stereoscopic display systems taught in commonly-owned U.S. Pat. App. Ser. No. 61/352,773, entitled "Stereoscopic liquid crystal display systems," filed Jun. 8, 2010, as taught in commonly-owned U.S. Pat. App. Ser. No. 61/306,897, entitled "Plastic liquid crystal polarization switch for direct view stereoscopic display Stereoscopic liquid crystal display systems," filed Feb. 22, 2010, both of which are herein incorporated by reference.

The PCP 200 may be attached to an LC panel using a refractive indexed matched adhesive which would significantly reduce internal reflections enhancing optical clarity. As with any adhesive technique however, it is preferred to reduce any stress-induced birefringence as this may alter the expected polarization states and compromises performance. Separate PCP 200 attachment is also an option.

Figure 3A:
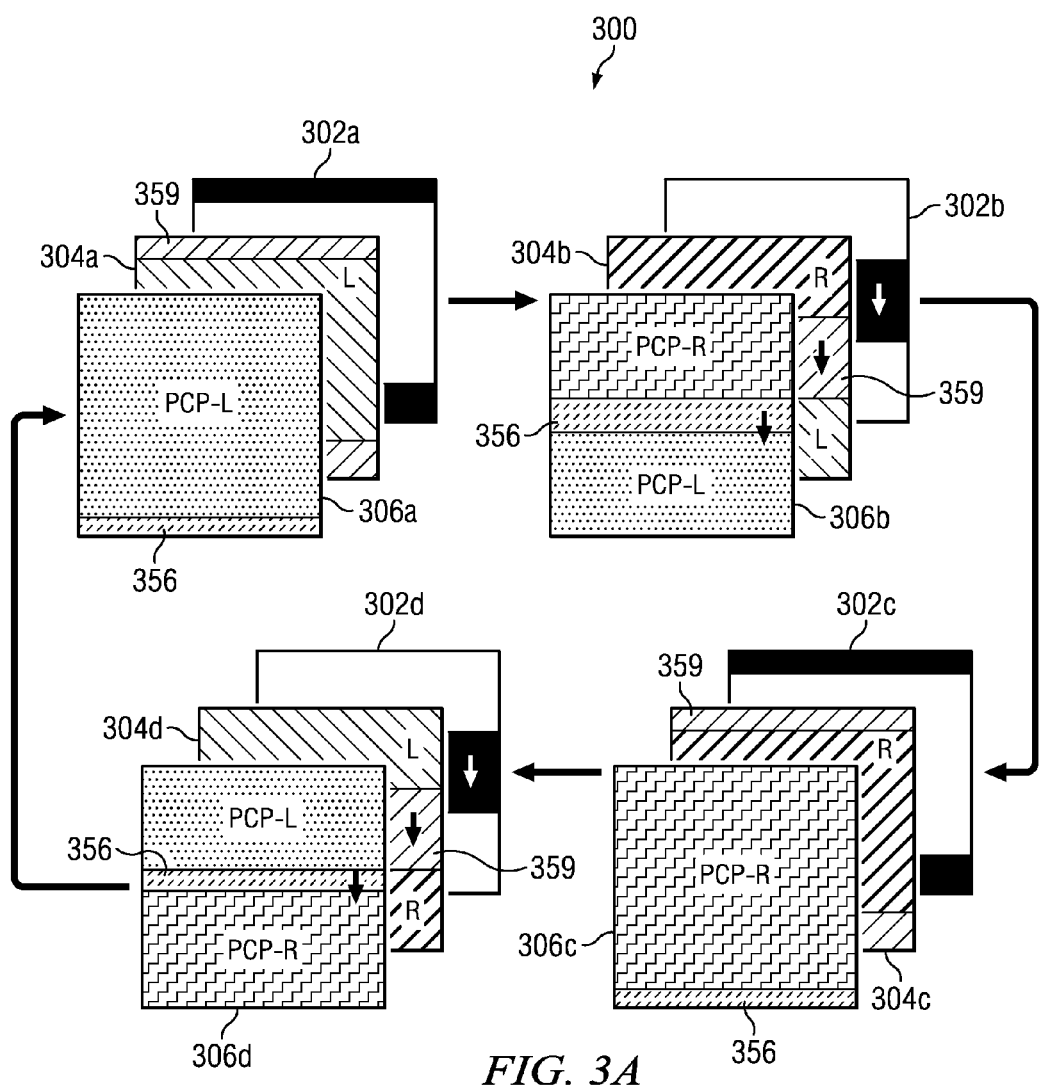
FIG. 3A is a schematic diagram illustrating an addressing cycle of a stereoscopic flat panel display system.

FIG. 3A is a schematic diagram illustrating an addressing cycle 300 of a stereoscopic flat panel display system. In this exemplary embodiment, backlight 302 is spatially controlled and PCP 306 is segmented, and they may operate in a scrolling manner, in synchronization with the LC modulation panel 304 update. The backlight 302, LC modulation panel 304, and PCP 306, are shown as separate layers, with the four schematic diagrams (a, b, c, and d) representing the system at four different times of a continuous addressing cycle. One cycle displays a single left and single right eye image. The diagram shows an address cycle where the LC modulation panel 304 is addressed line-by-line from top to bottom. As the address line progresses downward on the LC modulation panel 304, the region of settling liquid crystal appears to follow in a continuous scrolling fashion. The physical size of the mixed settling data region 359 displayed by the switching LC modulation panel 304 is determined by the settling speed of the material and the frame address rate. As described above, the period taken to switch to black is important, as the black-to-grey and grey-to-grey transitions may be accommodated as discussed by Chiu et al. For commercially-available fast twisted-nematic panels, the white-to-black settling time is around 2 ms, making the physical width of the LC switching band in FIG. 3A somewhat realistic with a 120 Hz frame update.

This exemplary system includes both scrolling segmented PCP 306 and spatially controlled backlight 302, as indicated by the different spatially separated portions depicted in the FIG. 3A. The physical size of the PCP 306 segments and backlight 302 spatially controlled portions may affect the performance and timing of the system but act very similar to a continuous device when the segments and portions are sufficiently small compared with the width of the unsettled LC 359.

In an exemplary embodiment, a flat panel display may include a spatially controllable backlight 302 with a plurality of illuminating portions operable to selectively provide light, a LC modulation panel 304 having modulation regions, and a PCP 306. The spatially controllable backlight 302 may have a plurality of illuminating portions operable to selectively provide light. The PCP 306 may have a plurality of polarization control segments associated with the modulation regions, such that the polarization control segments may selectively transform the state of polarization (SOP) of modulated light incident from the modulation regions. Also, a selected modulation region may be addressed with left eye image data, and polarization control instructions may be provided to a polarization control segment associated with the selected modulation region to operate in a left eye polarization display mode when a portion of the data lines in the selected modulation region display a predetermined portion of the left eye image frame. Furthermore, light may be provided to the selected modulation region from one or more selected illuminating portions when the selected modulation region includes a settled modulation region presenting image data corresponding to the left eye polarization control instructions.

The above-described embodiment may have many variations. For example, in some embodiments, the PCP may be a pi-cell. In some embodiments, the portion of the data lines in the selected modulation region may include substantially half of the data lines in the selected modulation region. In some embodiments, the polarization control instructions may be provided after addressing a first data line of the selected modulation region. In some embodiments, the polarization control segments may be switched to operate in the left eye polarization display mode and the SOP transformation is maintained for the polarization control segment until the polarization control segment is switched to the right eye polarization display mode (and vice versa for switching in the right eye polarization display mode). In some embodiments, an entire left eye image frame or right eye image frame may be addressed within $\frac{1}{120}$ second. In some embodiments, a settling time of the LC modulation panel for a middle data line of the selected modulation region and a second settling time of the PCP for the associated polarization control segment may be optimized for negligible left and right eye cross-talk when viewing the stereoscopic imagery through left and right eye analyzers. In some embodiments, each polarization control segment may include a zero twist LC zero to half-wave retardation modulator oriented at 45 degrees to an output polarization direction, and a quarter wave retarder oriented at 45 degrees relative to the orientation of the zero twist LC modulator. In some embodiments, the left eye polarization control instructions operate to may cause the zero twist LC modulator to retard light modulated by the LC modulation panel by a half wave, and where right eye polarization control instructions operate to cause the zero twist LC modulator to not retard light modulated by the LC modulation panel. In some embodiments, right eye instructions may operate to cause the zero twist LC to retard light modulated by the LC modulation panel by a half wave, and the left eye instructions may operate to cause the zero twist LC to not retard light modulated by the LC modulation panel. In some embodiments, adjacent segmented polarization control segments may be sequentially scrolled on the PCP. In some embodiments, the PCP may include strips of polarization switches operable to output incoming light to switch between orthogonal polarization states according to the polarization control instructions.

Figure 3B:
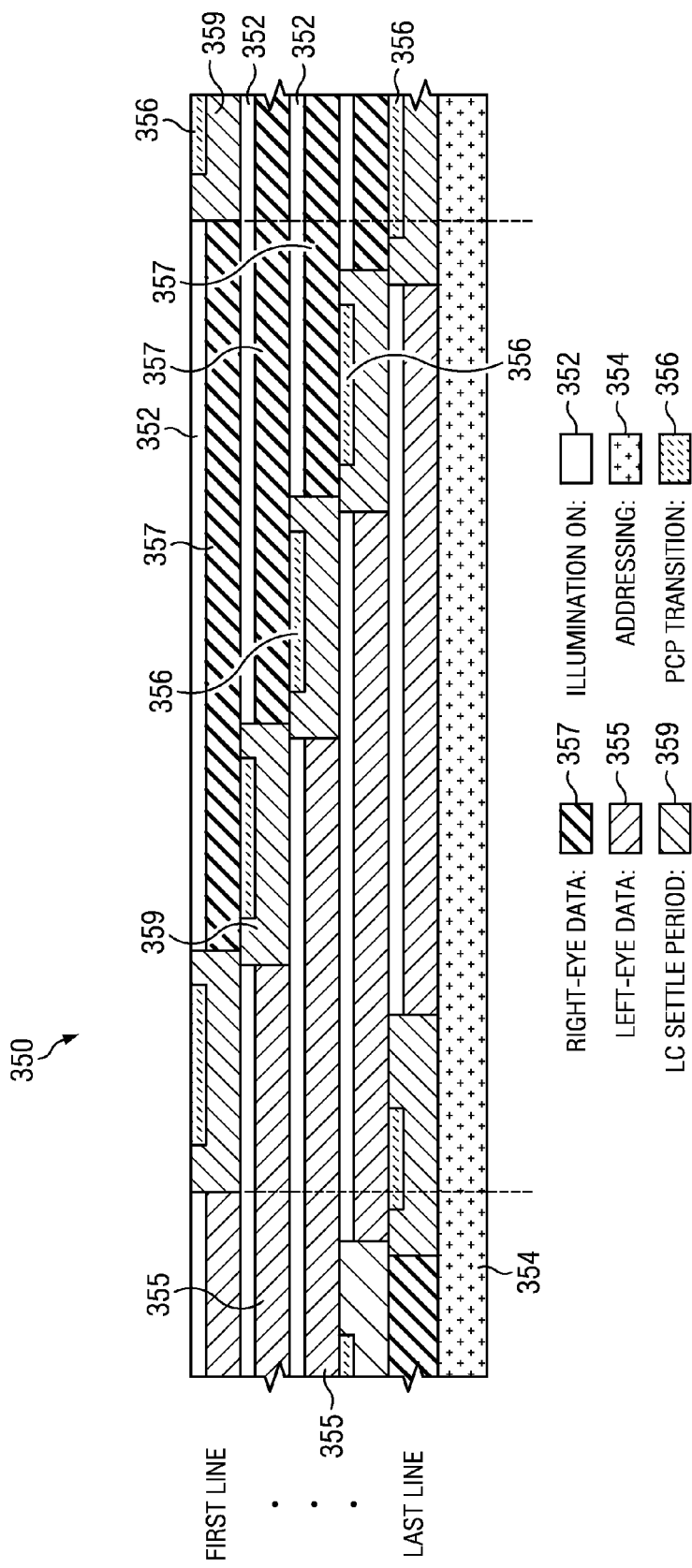
FIG. 3B is a schematic timing diagram illustrating a simplified timing sequence of the display system shown in FIG. 3A.

FIG. 3B is a schematic timing diagram 350 illustrating a simplified timing sequence of the display system shown in FIG. 3A. In this embodiment, 120 Hz LC addressing is assumed using more than four PCP and/or backlight portions. Under these assumptions, the timing diagram 350 may be derived showing the periods, states and start times of the different component states for chosen display lines. Each row is meant to represent an LC modulation panel data line and the first and last lines represent the top and bottom lines of the LC modulation panel 304 respectively. Time goes from left to right.

Each line of the timing diagram in FIG. 3B shows an instant where the line is addressed 354 followed substantially immediately by a settling period 359. Then, before the line is addressed again 354, there is a period where image data is correctly displayed (e.g., 357 and 355). Local illumination 352 occurs after settling 359 and before the next address instant 354. The staggering of the lines indicates the scrolling nature of the system. Any one region may not be illuminated approximately 25% of the time (i.e., approximately 75% illumination duty cycle). During the 25% un-illuminated duty cycle, the PCP is locally switched 356.

The advantages of such a system stem from a modest 120 Hz addressing rate and the large illumination duty cycle, though the system components may have high cost and complexity. Simplifications, as discussed below in FIGS. 4A-7B, through implementation of globally addressed, non-segmented components may reduce the system cost and complexity.

Referring back to FIG. 3B, the timing diagram 350 also shows the temporally overlapping of left- and right-eye images with conventional LC addressing. At any one instant there is no vertical line that passes through right- or left-eye data only, which precludes the use of a global backlight and PCP components. Fortunately, by manipulating the LC addressing and/or using either a spatially controllable backlight and/or PCP, other systems are made possible.

In accordance with an embodiment illustrated by FIGS. 3A and 3B, a method of displaying stereoscopic imagery on a flat panel display may include addressing data lines in a selected modulation region on the LC modulation panel 304 with left eye image data. The method may further include providing polarization control instructions to a polarization control segment associated with the selected modulation region, to operate in a left eye polarization display mode when a portion of the data lines in the selected modulation region display a predetermined portion of the left eye image frame. Additionally, the method may include providing the light to the selected modulation region from one or more selected illuminating portions, where the selected modulation region includes a settled modulation region presenting image data corresponding to the left eye polarization control instructions. Vice versa, the a similar method may be used to present right-eye image data corresponding to right eye polarization control instructions.

Stereoscopic Flat Panel Display with Updated Blanking Intervals

Figure 4A:
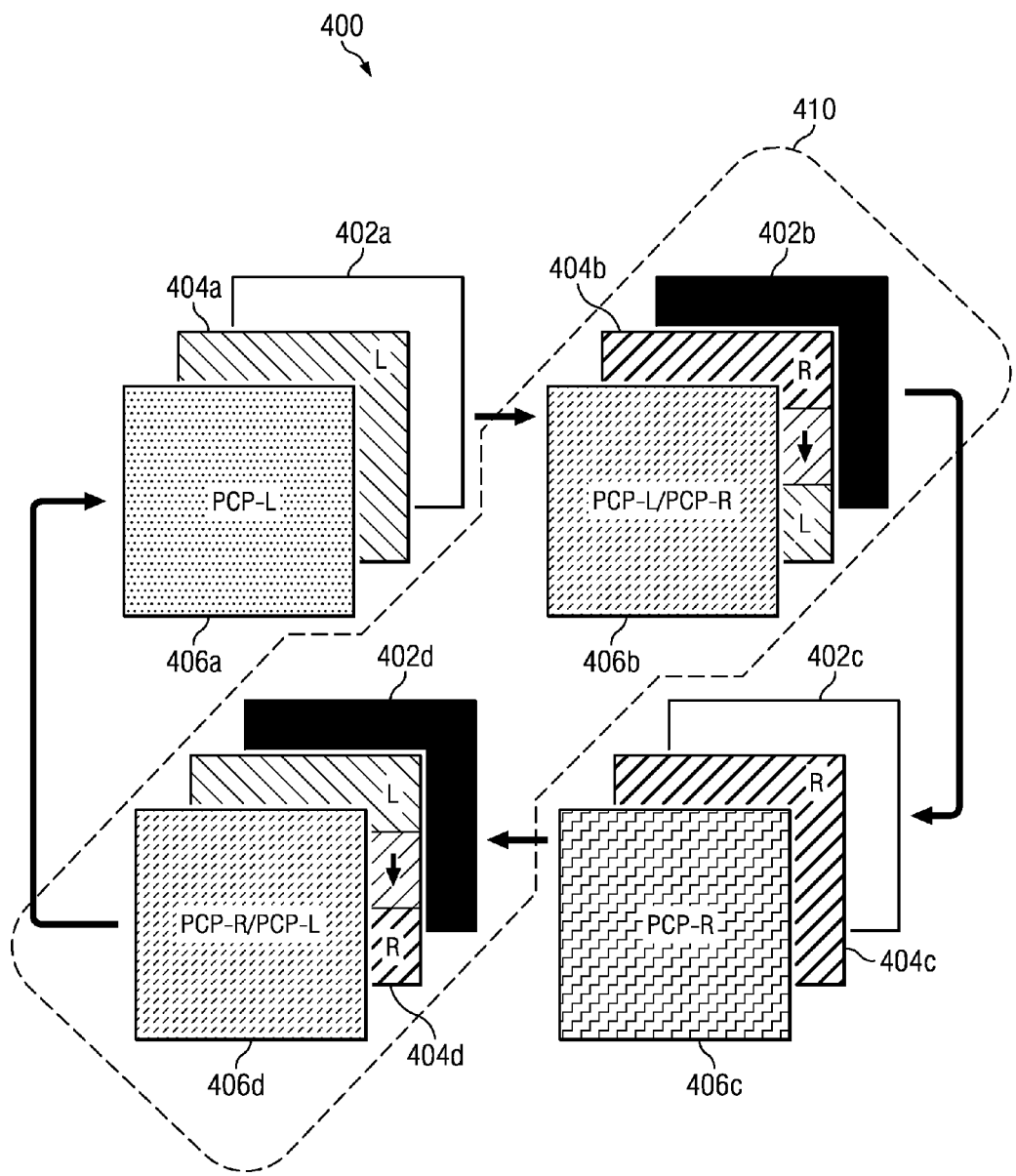
FIG. 4A is a schematic diagram illustrating an addressing cycle of a stereoscopic flat panel display system embodiment, in accordance with the present disclosure.

FIG. 4A is a schematic diagram illustrating an addressing cycle 400 of a stereoscopic flat panel display system embodiment. The stereoscopic front panel display system includes a backlight 402, an LC modulation panel 404, and a PCP 406. In an embodiment, the LC display 404 is a standard, normally white LC display. The stereoscopic front panel display system operates by addressing the LC display 404 with either left-eye image data or right-eye image data during a period in which the backlight 402 is not illuminated. The backlight 402 is illuminated after a majority of the data lines in the LC display 404 are settled to either a left-eye image or a right-eye image. The backlight 402 is illuminated until the next frame's addressing begins. In an embodiment, while the backlight 402 is not illuminated, the PCP 406 switches between a left-eye polarization mode and a right-eye polarization mode.

The LC modulation panel 404 is positioned to receive the light from the backlight 402. The PCP 406 is positioned to receive the modulated light incident from the LC modulation panel 404. The backlight 402 of the stereoscopic flat panel display selectively provides light to the LC modulation panel 404. In some states, the backlight 402 is not providing light; in other states, the backlight 402 provides light. The LC modulation panel 404 modulates the light incident from the backlight 402 and provides image content for left-eye and right-eye images. The PCP 406 selectively transforms the state of polarization (SOP) of the modulated light incident from the LC modulation panel 404 in synchronization with the backlight 402 and LC modulation panel 404.

The stereoscopic flat panel display has at least two operating states. The stereoscopic flat panel display operating in the transition state is shown in the area 410. The stereoscopic flat panel display operating in a presentation state is shown in area outside of area 410.

In the presentation state, the backlight 402 provides light to the LC modulation panel 404 and the PCP 406 operates in either a right-eye polarization mode or a left-eye polarization mode. In the right-eye polarization mode, the PCP 406 is transforming the light incident from the LC modulation panel 404 such that a left-eye analyzer would sufficiently block the transformed, modulated light output by the PCP 406 to minimize crosstalk. Similarly, in the left-eye polarization mode, the PCP 406 is transforming the light incident from the LC modulation panel 404 such that a right-eye analyzer would sufficiently block the transformed, modulated light output by the PCP 406 to minimize crosstalk. In an embodiment, in the right-eye polarization mode, the PCP 406 transforms the SOP of the modulated light into opposite handed (e.g., left hand) circular polarized light (centered on a design wavelength), and, in the left-eye polarization mode, the PCP 406 transforms the SOP of the modulated light into opposite handed (e.g., right hand) circular polarized light (centered on the design wavelength). In an exemplary embodiment, the design wavelength may be 520 nm. Either side of the exemplary 520 nm design wavelength, the polarization modulation may move away from a perfect circular polarization modulator such that transmission is reduced due to ellipticity.

In an embodiment, for circularly polarized cinema eyewear systems, the PCP 406 may be a zero-twist zero to halfwave LC cell oriented at 90° to a quarter wave retarder and oriented 45° to an input linear state of polarization (SOP). In an example embodiment, the net phase may shift between orthogonal linear components of the right- and left-eye SOP range between +/−73° and +/−80° respectively, for 589 nm wavelength light.

When the PCP 406 is in the right-eye polarization mode (e.g., 406*c*), the LC modulation panel 404 may operate in a right-eye image mode (e.g., 404*c*), meaning that the LC modulation panel 404 may be providing enough right-eye image data to minimize crosstalk. Similarly, when the PCP 406 is in the left-eye polarization mode (e.g., 406*a*), the LC modulation panel 404 may operate in a left-eye image mode (404*a*), meaning that the LC modulation panel 404 may be providing enough left-eye image data to minimize crosstalk.

Thus, in the presentation state, when the PCP 406 is operating in the right-eye polarization mode (e.g., 406*c*), the LC modulation panel 404 operates in the right-eye image mode (e.g., 404*c*) and the backlight is providing light (e.g., 402*c*); and in the transition state, when the PCP 406 is transitioning from the right-eye to the left-eye polarization mode (e.g., 406*d*), the LC modulation panel 404 is changing from the right-eye to the left-eye image mode (e.g., 404*d*) and the backlight 402*d* is not providing light. Similarly, in the presentation state, when the PCP 406 is operating in the left-eye polarization mode (e.g., 406*a*), the LC modulation panel 404 operates in the left-eye image mode (e.g., 404*a*) and the backlight is providing light (e.g., 402*a*); and in the transition state, when the PCP 406 is transitioning from the left-eye to the right-eye polarization mode (e.g., 406*b*), the LC modulation panel 404 is changing from left-eye to right-eye image mode (e.g., 404*b*) and the backlight is not providing light (e.g., 402*b*).

In an embodiment, the LC modulation panel 404 is continuously addressed and, thus, is substantially continuously changing between sequential left-eye and right-eye image data in a line-by-line manner. In this embodiment, right-eye image mode may be when the LC modulation panel 404 has a majority (e.g., more than 50%) of settled data lines displaying right-eye image content and left-eye image mode may be when the LC modulation panel 404 has a majority (e.g., more than 50%) of settled data lines displaying left-eye image content. Thus, in various alternative embodiments, right-eye image mode may include the LC modulation panel 404 displaying, for example, 60%, 70%, 80%, 90%, or 99% right-eye image data, depending on design parameters and desired crosstalk tolerance.

In the transition state, the backlight does not provide light to the LC modulation panel 404 when the LC modulation panel 404 changes between the left-eye and right-eye image modes and when the PCP 406 transitions between the right-eye and the left-eye polarization modes. As discussed above, because the image modes and the polarization modes constitute a range of acceptable embodiments depending on design and crosstalk parameters in the presentation state, the transition between the left- and right-eye polarization modes and the changing between the left- and right-eye image modes may constitute a range of transition periods in the transition state. For example, if the right-eye image mode and left-eye image mode of the LC modulation panel 404 has a design parameter of ≥90% right-eye image data and ≥90% left-eye image data settled (respectively) in the presentation state, then the transition state would constitute the period of time when the LC modulation panel 404 is not at ≥90% right-eye image data and ≥90% left-eye image data settled.

In an embodiment, the polarization modes may include altering the light to circularly polarized light capable of being analyzed by circular polarizer analyzers. In another embodiment, the polarization modes may include altering the light to linearly polarized light capable of being analyzed by linear polarizer analyzers.

The backlight 402 may be a globally addressed backlight. And the PCP 406 may be a globally addressed, non-segmented PCP.

Figure 4B:
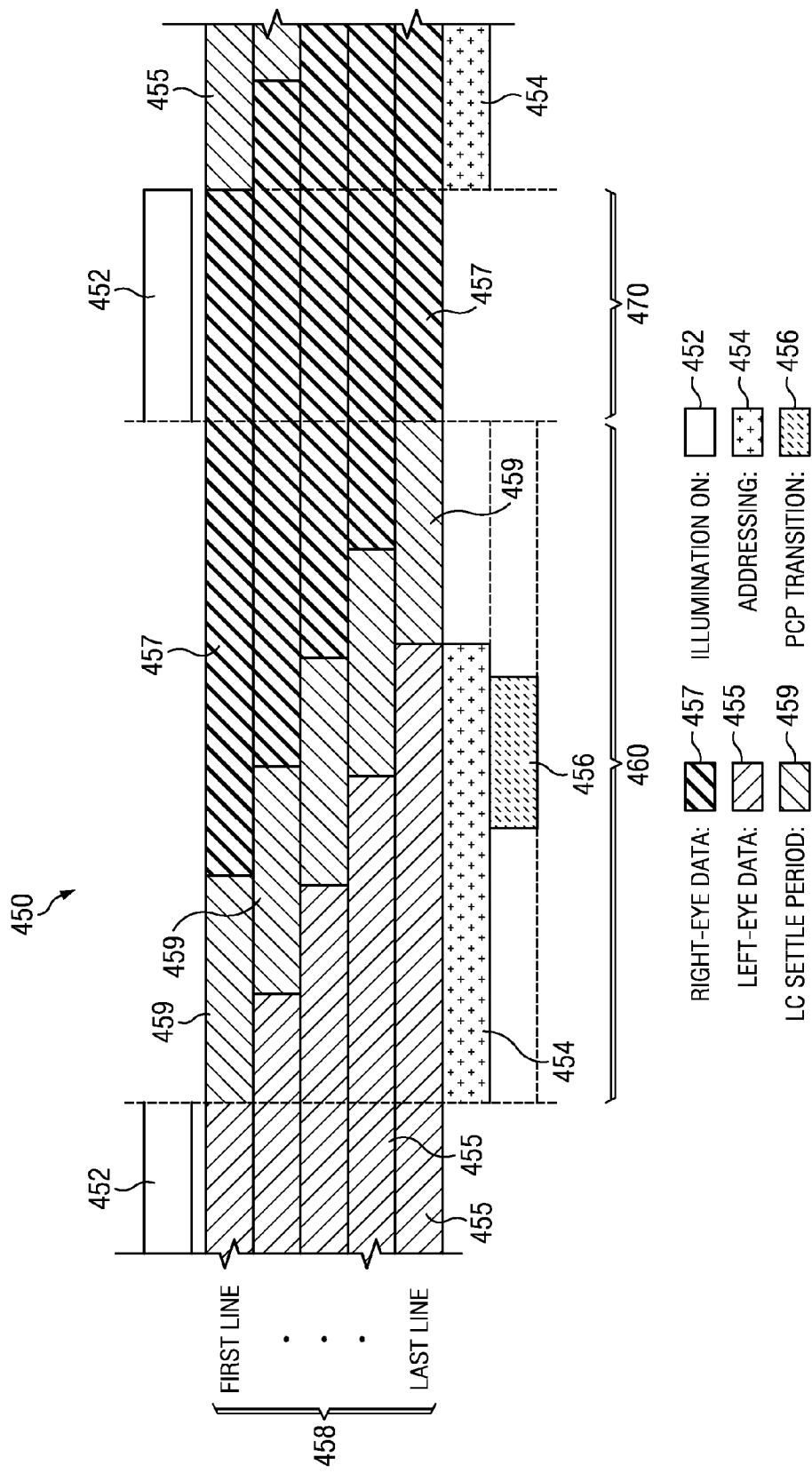
FIG. 4B is a schematic timing diagram illustrating a timing sequence of the system shown in FIG. 4A, in accordance with the present disclosure.

FIG. 4B is a schematic timing diagram illustrating a timing sequence 450 of the system shown in FIG. 4A. The transition state 460 shows an exemplary transition state in which an LC display is addressed 454 and a PCP is transitioned 456 while the backlight is not providing light. The LC display is changing between left-eye image data 455 and right-eye image data 457 in the transition period 460. In this exemplary embodiment, all lines of data 458 are settled 459 with either image data associated with one view (e.g., right-eye image data 457) before the backlight is illuminated 452.

As discussed above, however, in the presentation mode an acceptable range of settled lines may include any number of lines sufficient to substantially minimize unwanted crosstalk effects. Thus, this diagram is for illustration purposes only. In practice, the LC modulation panel is continuously addressed and, thus, is substantially continuously changing between sequential left-eye and right-eye image data in a line-by-line addressing manner. Thus, when the LC modulation panel has a majority (e.g., more than 50%) of settled data lines displaying image content associated with either the right-eye or left-eye view, the system may be in the presentation state 470 and the backlight may be illuminated 452.

In an embodiment, assuming a 2 ms LC settle time and a 4 ms (240 Hz) frame address time, the presentation state 470 may be a 25% duty cycle. In this embodiment, the illumination 452 is also a 25% duty cycle. This is particularly feasible for illuminators such as LEDs—whose output is often thermally limited to a fixed average output and not significantly dependent on duty cycle and peak output. The switching period of the PCP can be as much as about 6 ms unilluminated period offering several options for a stereoscopic flat panel display mode and material. In an embodiment, the transition state 460 is a 75% duty cycle.

In an embodiment, the transition state comprises a time period equal to or greater than a settling time period associated with the LC modulation panel addressing time period and/or a PCP settling period.

Referring back to FIG. 1, a controller 122 is provided for a stereoscopic flat panel display system 100. In an embodiment, the controller is capable of controlling the backlight 102, LC modulation panel 104, and PCP 106 in a manner consistent with the operation of FIGS. 4A and 4B. The controller may include a backlight interface for providing a backlight control signal to the backlight, an LC interface for providing an LC control signal to the LC modulation panel, and a PCP interface for providing a PCP control signal to the PCP. The backlight interface may control the backlight to not provide light to the LC modulation panel in the transition state and may control the backlight to provide light to the LC modulation panel in the presentation state. The LC interface may control the LC modulation panel to modulate the light incident from the backlight and to operate in the left-eye or right-eye image mode and to transition between these modes. The PCP interface may control the PCP to selectively transform the state of polarization (SOP) of the modulated light incident from the LC modulation panel by the left-eye or right-eye polarization mode and to transition between these modes.

Figure 5A:
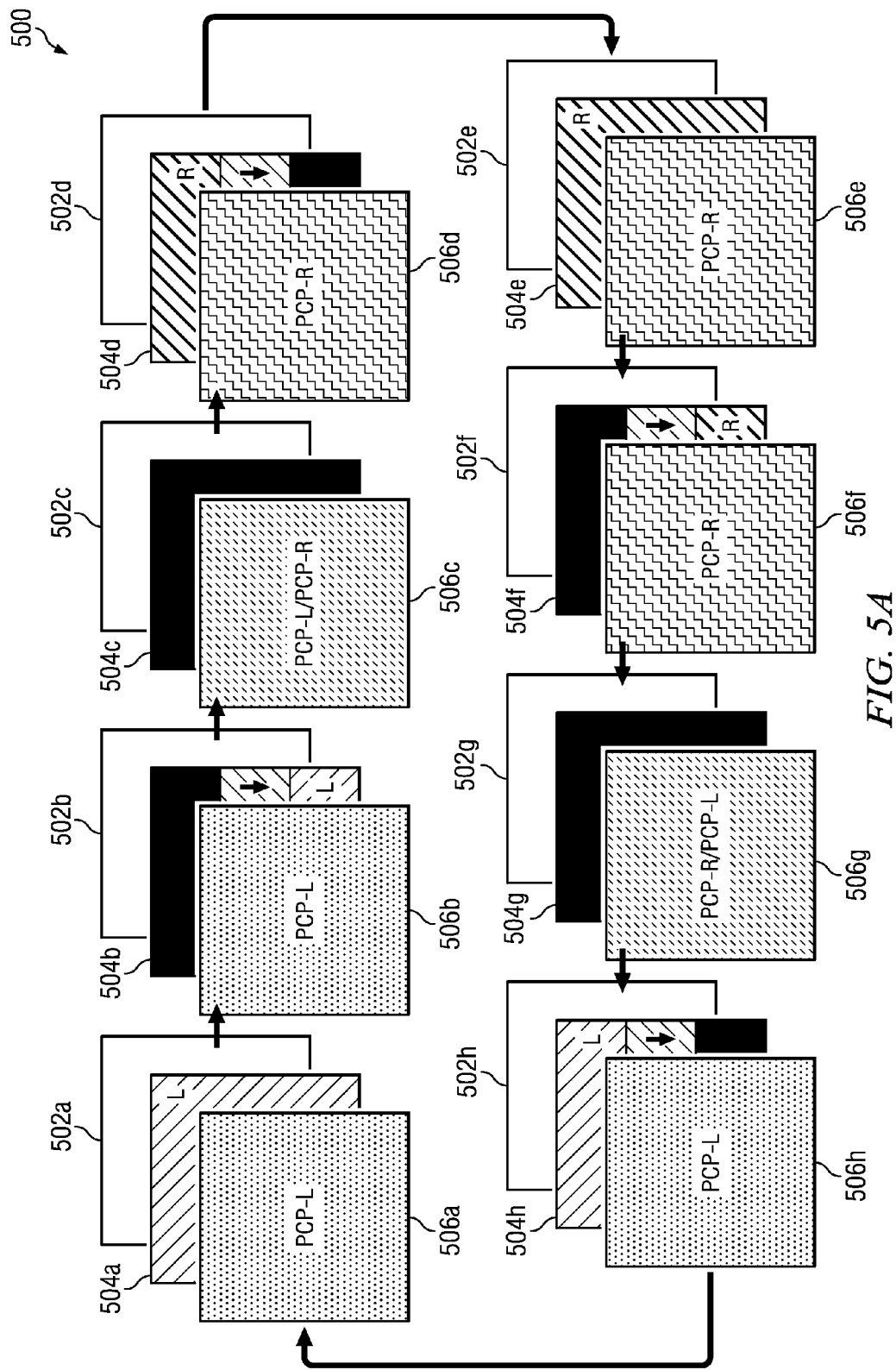
FIG. 5A is a schematic diagram illustrating the addressing cycle of another stereoscopic flat panel display system embodiment, in accordance with the present disclosure.

FIG. 5A is a schematic diagram illustrating the addressing cycle 500 of another stereoscopic flat panel display system embodiment. The stereoscopic front panel display system includes a backlight 502, an LC modulation panel 504, and a PCP 506. The embodiment of FIG. 5A utilizes a globally-modulated PCP 506 and a continuous backlight 502.

The LC modulation panel 504 is positioned to receive the light from the backlight 502. The PCP 506 is positioned to receive the modulated light incident from the LC modulation panel 504. The backlight 502 of the stereoscopic flat panel display provides light to the LC modulation panel 504. The LC modulation panel 504 modulates the light incident from the backlight 502 and provides image content for left-eye and right-eye images. The PCP 506 selectively transforms the state of polarization (SOP) of the modulated light incident from the LC modulation panel 504 in synchronization with the LC modulation panel 504.

The stereoscopic flat panel display has at least four operating states. The stereoscopic flat panel display operating in the perspective view state is indicated by reference numerals 502*a/e*, 504*a/e*, and 506*a/e*. The stereoscopic flat panel display operating in a first LC transition state is indicated by reference numerals 502*b/f*, 504*b/f*, and 506*b/f*. The stereoscopic flat panel display operating in a PCP transition state is indicated by reference numerals 502*c/g*, 504*c/g*, and 506*c/g*. The stereoscopic flat panel display operating in a second LC transition state is indicated by reference numerals 502*d/h*, 504*d/h*, and 506*d/h*.

In the perspective view state, the backlight 502 provides light to the LC modulation panel 504 and the PCP 506 operates in either a right-eye polarization mode or a left-eye polarization mode. In the right-eye polarization mode, the PCP 506 is transforming the light incident from the LC modulation panel 504 such that a left-eye analyzer would sufficiently block the transformed, modulated light output by the PCP 506 to minimize crosstalk. Similarly, in the left-eye polarization mode, the PCP 506 is transforming the light incident from the LC modulation panel 504 such that a right-eye analyzer would sufficiently block the transformed, modulated light output by the PCP 506 to minimize crosstalk.

More specifically, when the PCP 506 is in the right-eye polarization mode (e.g., 506*e*), the LC modulation panel 504 operates in a right-eye image mode (e.g., 504*e*), meaning that the LC modulation panel 504 may be providing enough right-eye image data to minimize crosstalk. Similarly, when the PCP 506 is in the left-eye polarization mode (e.g., 506*a*), the LC modulation panel 504 operates in a left-eye image mode (504*a*), meaning that the LC modulation panel 504 may be providing enough left-eye image data to minimize crosstalk.

Thus, in the perspective view state, when the PCP 506 is operating in the right-eye polarization mode (e.g., 506*e*), the LC modulation panel 504 operates in the right-eye image mode (e.g., 504*e*) and the backlight is providing light (e.g., 502*e*). Similarly, in the perspective view state, when the PCP 506 is operating in the left-eye polarization mode (e.g., 506*a*), the LC modulation panel 504 operates in the left-eye image mode (e.g., 504*a*) and the backlight is providing light (e.g., 502*a*)

In the first LC transition state, when the PCP 506 is operating in the right-eye polarization mode (e.g., 506*f*), the LC modulation panel 504 is changing from a right-eye image mode to substantially black image content (e.g., 504*f*) and the backlight 502 is providing illumination; and when the PCP is operating in the left-eye polarization mode (e.g., 506*b*), the LC modulation panel is changing from left-eye image mode to substantially black image content (e.g., 504*b*) and the backlight is providing illumination 502.

In the PCP transition state, the PCP is transitioning between the left-eye and the right-eye polarization modes (e.g., 506*c* or 506*g*), the LC modulation panel is presenting substantially black image content (e.g., 504*c* or 504*g*), and the backlight is providing illumination 502.

In the second LC transition state, when the PCP 506 is operating in the right-eye polarization mode (e.g., 506*d*), the LC modulation panel 504 is changing from substantially black image content to a right-eye image mode (e.g., 504*d*), and the backlight 502 is providing illumination; and when the PCP is operating in the left-eye polarization mode (e.g., 506*h*), the LC modulation panel is changing from substantially black image content to left-eye image mode (e.g., 504*h*), and the backlight is providing illumination 502.

In an embodiment, the LC modulation panel 504 is continuously addressed and, thus, is substantially continuously changing between sequential left-eye or right-eye image data and substantially black image data in a line-by-line addressing manner. In this embodiment, right-eye image mode may be when the LC modulation panel 504 has a majority (e.g., more than 50%) of settled data lines displaying right-eye image content and left-eye image mode may be when the LC modulation panel 504 has a majority (e.g., more than 50%) of settled data lines displaying left-eye image content. Thus, right-eye image mode may include the LC modulation panel 504 displaying, for example, 60%, 70%, 80%, 90%, or 99% right-eye image data, depending on design parameters and desired crosstalk tolerance.

In the PCP transition state, the LC modulation panel 504 is displaying substantially black image content when the PCP modulation panel 506 changes between the left-eye and right-eye polarization modes. As discussed above, because the image modes and the polarization modes constitute a range of acceptable embodiments depending on design and crosstalk parameters in the perspective view states and the first and second LC transition states, the transition between the left- and right-eye polarization modes may constitute a range of transition periods. For example, if the right-eye image mode and left-eye image mode of the LC modulation panel 504 has a design parameter of ≥90% right-eye image data and ≥90% left-eye image data settled (respectively) in the perspective view state, then the other states would constitute the period of time when the LC modulation panel 504 is not at ≥90% right-eye image data and ≥90% left-eye image data settled.

In an embodiment, the stereoscopic flat panel display PCP's right- and left-eye polarization modes may alter the light to circularly polarized light capable of being analyzed by circular polarizer analyzers. In another embodiment, the stereoscopic flat panel display PCP's right- and left-eye polarization modes may alter the light to linearly polarized light capable of being analyzed by a linear polarizer analyzers.

In an embodiment, the pixels of the LC modulation panel 504 are addressed at regular intervals. In another embodiment, the pixels of the LC modulation panel 504 are addressed at a beginning portion of the first LC transition state and at a beginning portion of the second LC transition state. In another embodiment, the pixels of the LC modulation panel 504 are addressed at a beginning portion of the perspective view state and at a beginning portion of the first LC transition state.

In an embodiment, the backlight 502 is always illuminated. In another embodiment, the PCP 506 is also non-segmented.

This approach may be used for illumination systems that are more difficult to modulate such as cold cathode fluorescent tubes (CCFLs). The approach of FIG. 5A includes the backlight 502 represented by a white square to indicate the continuously on status. The LCD panel 504 is updated in a standard scrolling manner, but interspersed with the right- and left-eye substantially black frame images. The purpose of the black frames is to provide periods where the global PCP 506 may be switched between states without mixing too much the views between the eyes, thus substantially minimizing crosstalk to acceptable viewing levels. In an embodiment, the display may be operated equal to or greater than 240 Hz.

Figure 5B:
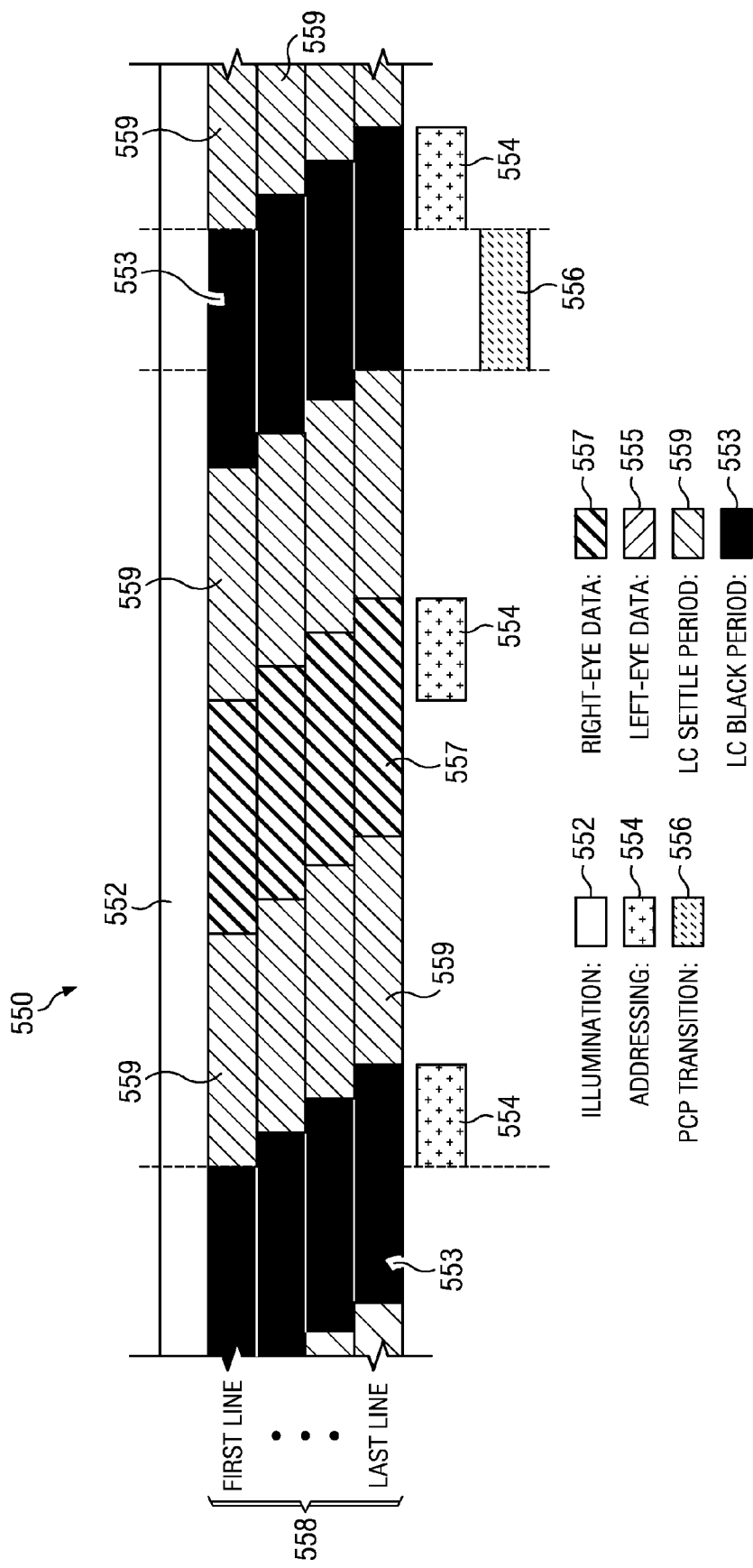
FIG. 5B is a schematic timing diagram illustrating a timing sequence of the system shown in FIG. 5A, in accordance with the present disclosure.

FIG. 5B is a schematic timing diagram illustrating a timing sequence 550 of the system shown in FIG. 5A. In this embodiment, each frame, regardless of whether it is a black frame 553 or image content associated with a left-eye image 555 or right-eye image 557, is addressed 554 in 0.8 ms (e.g., 1.2 KHz). The backlight is continuously illuminated 552. The settling time for each frame is indicated by 559. The PCP is transitioned 556 during the substantially black frames 553.

FIG. 5C is a schematic diagram illustrating an alternative timing sequence 580 of the system shown in FIG. 5A. In this embodiment, a left- or right-eye data frame 585, 587 and the next black frame 583 are addressed 584 with substantially no pause. After the black frame 583 is addressed, a pause is used to allow the display to settle 589 to black 583 and allow the PCP to switch 586. This allows for a more accessible frame address period of 1.4 ms (i.e., 700 Hz), but at the expense of some brightness. The timing diagram of FIG. 5B yields a brightness efficiency of about 38% and the timing diagram of FIG. 5C yields a lower brightness of about 29%.

In an alternative embodiment, the backlight 502 of the stereoscopic flat panel display system of FIG. 5A is operable to selectively provide light to the system. In this embodiment, the backlight 502 may optionally be not illuminated during the PCP transition state (e.g., 502c/g). In some embodiments, for a short period prior to the PCP transition state and for a short period after the PCP transition state, the backlight 502 is also not providing light. In some embodiments, the backlight 502 is not providing light prior to the PCP transition state, but does provide provides light after the PCP transition state. In still other embodiments, during the first LC transition state, the PCP transition state, and the second LC transition state, the backlight is not providing light.

In another embodiment (not shown), the backlight is spatially controlled to help suppress cross-talk in cases where LC panels struggle to fully erase previous image information despite black frame insertion. In this embodiment, the backlight 502 may include a top portion and a bottom portion and these portions may be staggered slightly, such that the top portion turns on before the bottom portion or vice versa. Whether the top or bottom portion turns on first depends on whether the LC modulation panel 504 is addressed top to bottom or bottom to top. For example, if the LC modulation panel 504 is addressed from bottom to top, the bottom portion of the backlight 502 will turn on before the top portion. In an embodiment, one portion of the backlight 502 turns on 0.5 ms after the other portion (e.g., the bottom portion turns on 0.5 ms after the top portion) and both portions stay illuminated for 4 ms. Both portions are not illuminated for 3 ms while the PCP 506 transitions. In an embodiment, during the first LC transition state, a top portion of the backlight 502b is turned off before a bottom portion of the backlight 502b is turned off; during the PCP transition state, both portions of the backlight 502c are turned off; and during the second LC transition state, the top portion of the backlight 502d is turned on before the bottom portion of the backlight 502d is turned on.

Figure 6A:
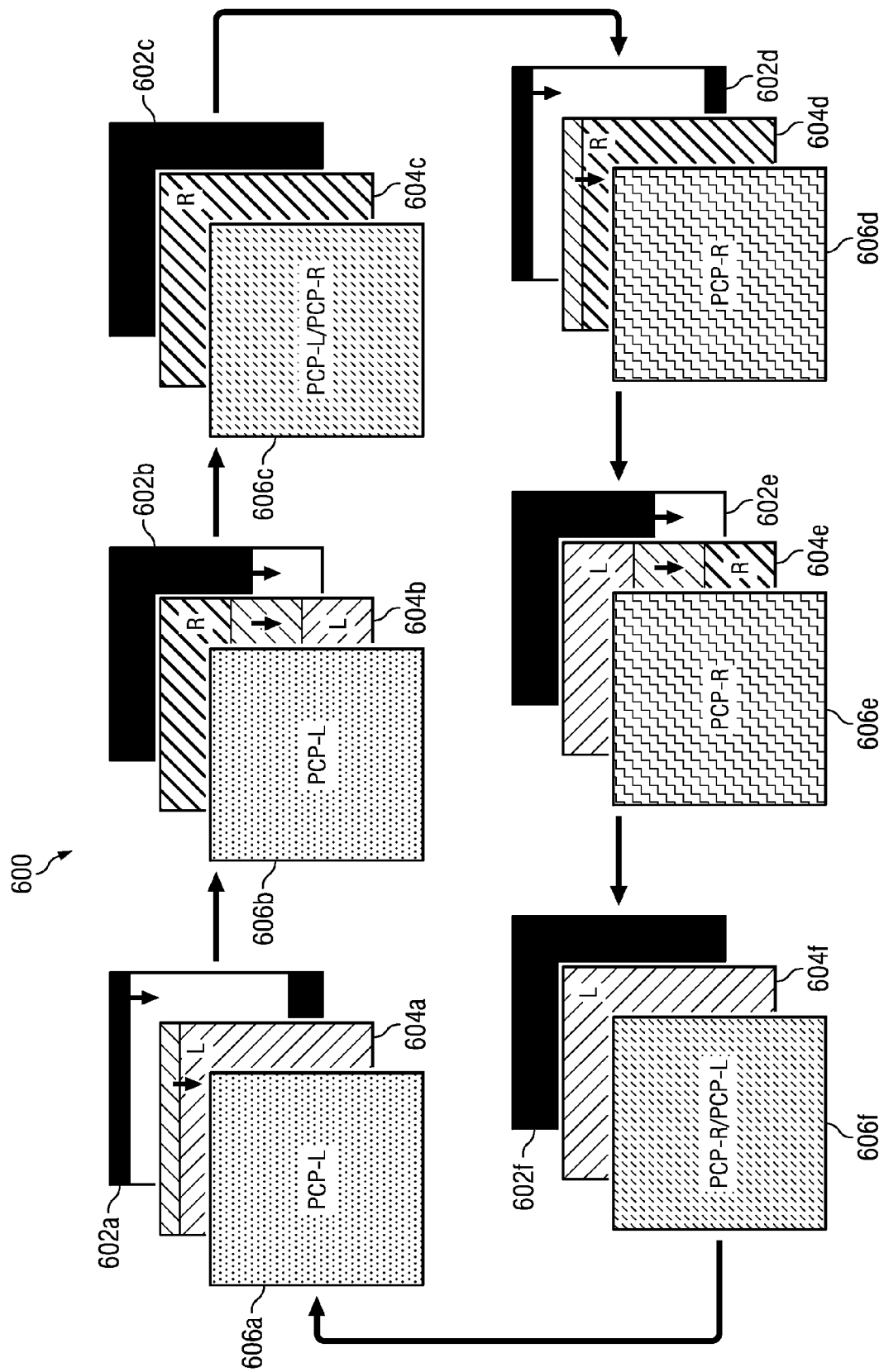
FIG. 6A is a schematic diagram illustrating the addressing cycle of another stereoscopic flat panel display system embodiment, in accordance with the present disclosure.

Stereoscopic Flat Panel Display with Scrolling Backlight and Synchronized Liquid Crystal Display Update FIG. 6A is a schematic diagram illustrating the addressing cycle 600 of another stereoscopic flat panel display system embodiment. The stereoscopic front panel display system includes a backlight 602, an LC modulation panel 604, and a PCP 606. The embodiment of FIG. 6A may employ a globally-addressed PCP 606 with a scrolling backlight 602. The backlight 602 may have a plurality of backlight illuminating portions. The backlight illuminating portions may selectively provide light to the liquid crystal (LC) modulation panel 604. The LC modulation panel 604 may have LC modulation regions. The LC modulation regions may modulate the light incident from the backlight 602. The PCP 606 may transform the state of polarization (SOP) of the modulated light incident from the LC modulation panel 604.

In operation, stereoscopic imagery is displayed on the stereoscopic flat panel display. The PCP 606 may be controlled with left eye or right eye polarization control signals. The left-eye polarization control signals allow for PCP 606 operation in a left-eye polarization mode and the right-eye polarization control signals allow for PCP 606 operation in a right-eye polarization mode. Selected backlight illuminating portions provide light to selected LC modulation regions. The selected LC modulation regions may include modulation regions that are sufficiently settled in either a left-eye or right-eye image mode, such that crosstalk is substantially minimized. The LC modulation regions image mode corresponds to either the left eye polarization control signals and right eye polarization control signals. Thus, if the PCP 606 is operating in the left-eye polarization mode (e.g., being controlled with left-eye polarization control signals), then the backlight 602 provides light via selected backlight illumination portions to a portion of the LC modulation regions currently displaying left-eye image data. If the PCP 606 is operating in the right-eye polarization mode (e.g., being controlled with right-eye polarization control signals), then the backlight 602 provides light via selected backlight illumination portions to a portion of the LC modulation regions currently displaying right-eye image data.

The LC modulation panel 604 may be addressed by addressing data lines of the LC modulation regions in a substantially continuous line-by-line manner.

In an embodiment, when the PCP 606 is controlled with left-eye polarization control signals, the PCP 606 is instructed to transform the SOP of the modulated light such that a right-eye analyzer would block the light and when the PCP 606 is controlled with right-eye polarization control signals, the PCP 606 is instructed to transform the SOP of the modulated light such that a left-eye analyzer would block the light.

The PCP 606 may be switched between being controlled by left-eye and right-eye polarization control signals. In an embodiment, during the switching, the backlight illuminating portions are not providing light.

In some embodiments, the switching of the polarization control signals occurs after the LC modulation regions are settled. In other embodiments, the switching occurs while latter data lines of a bottom LC modulation region of the LC modulation panel 604 are settling.

Adjacent backlight illuminating portions may be sequentially turned off after corresponding LC modulation regions are addressed. In an embodiment, each of the backlight illuminating portions may be turned on after the LC modulation regions are settled.

Figure 6B:
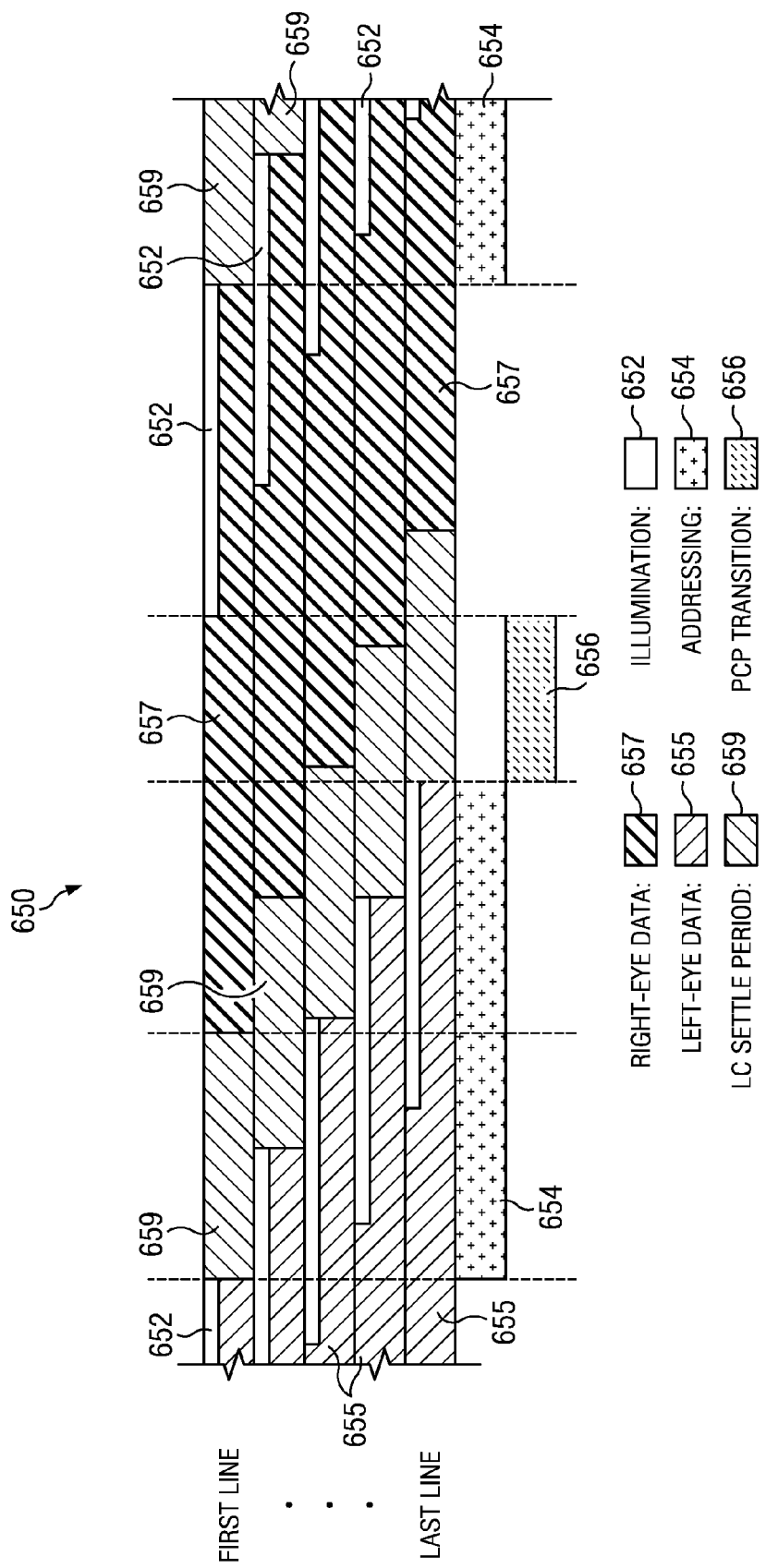
FIG. 6B is a schematic timing diagram illustrating a timing sequence of the system shown in FIG. 6A, in accordance with the present disclosure.

FIG. 6B is a schematic timing diagram illustrating a timing sequence 650 of the system shown in FIG. 6A. In an embodiment, the LC panel addressing 654 is assumed to be a continuous scrolling line-by-line LC panel, operating at a 120 Hz frame rate. A frame is written from the top while illuminating the settled previous frame's data still existing toward the bottom of the frame. For example, in the first line, the right-eye data is written 659 to 657 while the settled left-eye data of the last line 655 is illuminated 652. As the addressing advances, the backlight scrolls off the bottom of the panel and the display becomes black. At this time the PCP is switched 656. Once the PCP takes on its new state, the illumination of the settled LC at the display top begins. Again, assuming typical PCP switching times (e.g., about 1.5 ms for a pi-cell version) and LC settling times (e.g., 2 ms white to black), about 33% illumination duty cycle is used to operate this system.

Stereoscopic Flat Panel Display with a Continuously Lit Backlight

Figure 7A:
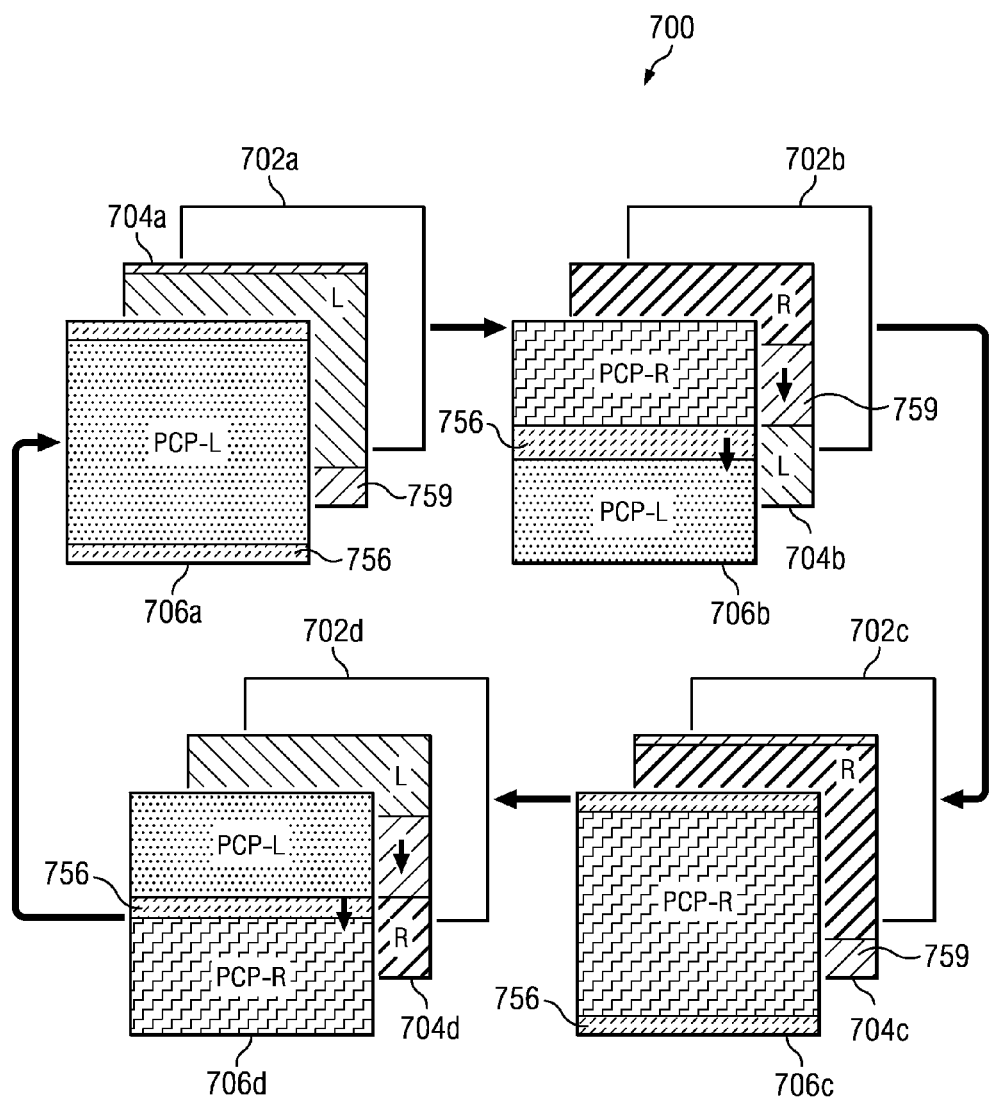
FIG. 7A is a schematic diagram illustrating the addressing cycle of another Stereoscopic flat panel display system embodiment, in accordance with the present disclosure.

FIG. 7A is a schematic diagram illustrating the addressing cycle 700 of another stereoscopic flat panel display system embodiment. The flat panel display 700 includes a backlight element 702 operable to provide light, a liquid crystal (LC) modulation element 704, and a polarization control panel (PCP) 706 having a plurality of segmented polarization control segments. In this embodiment, the backlight element 702 provides continuous illumination to the LC modulation element 704 throughout the addressing cycle 700 (e.g., 702*a/b/c/d*).

The LC modulation element 704 is positioned to receive the light incident from the backlight element 702 and is operable to modulate the light incident from the backlight element 702. The PCP 706 has a plurality of segmented polarization control segments positioned to receive the modulated light incident from the LC modulation element 704. The segmented polarization control segments are operable to selectively transform the state of polarization (SOP) of the modulated light incident from the LC modulation element 704 between orthogonal polarization states according to the polarization control instructions.

For example, left-eye polarization control instructions control the majority of the PCP 706*a* while left-eye image data fills the majority of the LC modulation element 704*a*; right-eye polarization control instructions control the majority of the PCP 706*c* while right-eye image data fills the majority of the LC modulation element 704*c*. Also by way of example, either left- or right-eye polarization control instructions control a top or bottom portion of the PCP 706*b*, 704*d* while left- or right-eye image data fills a top or bottom portion of the LC modulation element 704*b*, 704*d*. The PCP transition time 756 similarly tracks the LC modulation element settle time 759.

In an embodiment, the LC modulation element 704 includes modulation regions that provide modulated light to respective associated segmented polarization control segments.

In an embodiment, each polarization control segment may include a zero twist LC zero to half-wave retardation modulator oriented at 45 degrees to an output polarization direction and a quarter wave retarder oriented at 90 degrees relative to the orientation of the zero twist LC modulator. Here, the left eye instructions may operate to cause the zero twist LC to retard light modulated by the LC by a half wave and the right eye instructions operate to cause the zero twist LC to not retard light modulated by the LC (or vice versa in another embodiment).

Alternative polarization control segments may include a pair of pi-cells in a push-pull configuration, as taught in commonly-owned U.S. Pat. No. 6,975,345 to Lipton et al., or other polarization modulators, such as U.S. Pat. No. 7,528,906 to Mike Robinson, herein incorporated by reference.

In the embodiments described with reference to FIGS. 7A and 7B, there is substantially no illumination overhead because the backlight provides continuous illumination to the LC panel 704, yielding 100% brightness. Also, the addressing of the LC panel 704 is continuous and may be implemented at a 120 Hz frame rate. However, since the display is visible at all times, there is no hiding the PCP transition time 756 and the LC settling time 759, which may lead to finite cross-talk between the left- and right-eye imagery. Synchronizing the switching/settling periods 756, 759 may minimize the left to right leakage (and vice versa). Calculations using typical switching periods indicate that there is a lower limit of about 2% on the cross-talk. While any cross-talk is generally undesirable, practical tests have shown that this level of cross-talk may provide satisfactory results. Use of faster LC modulator panels and PCPs may achieve cross-talk below 1%.

Figure 7B:
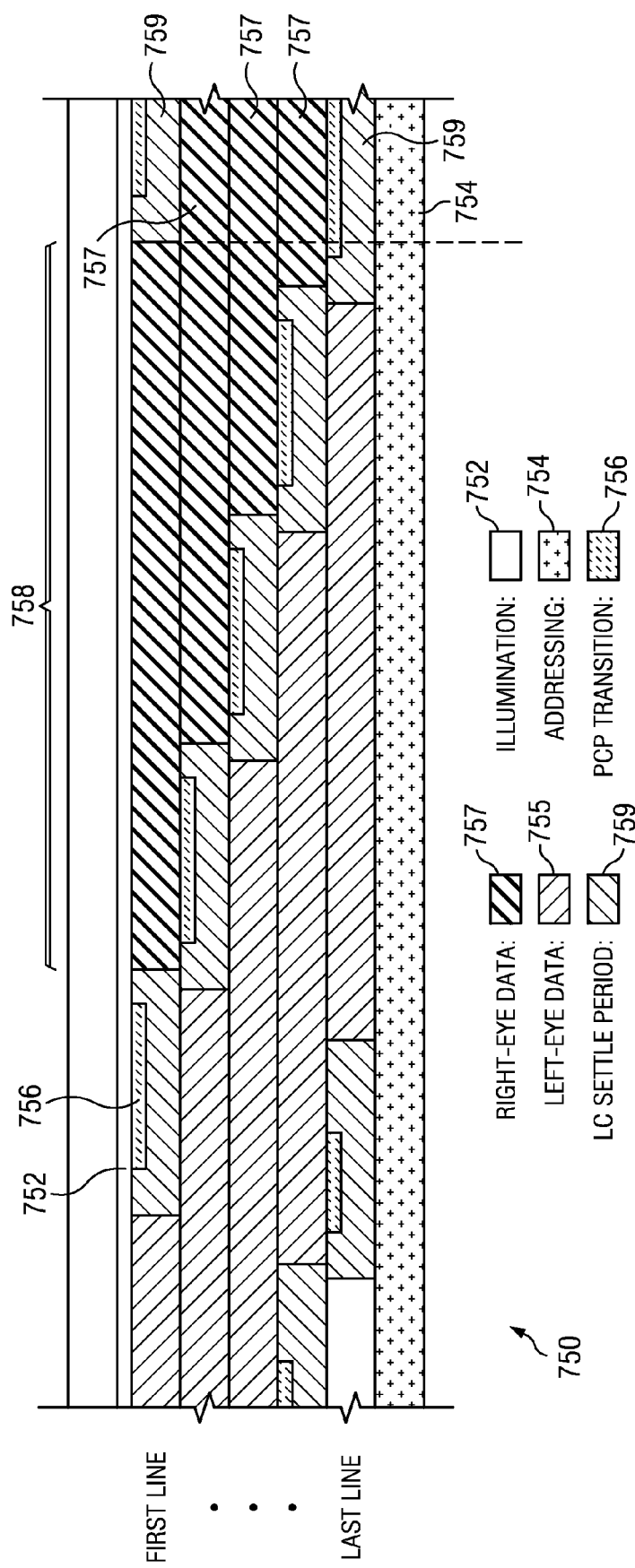
FIG. 7B is a schematic timing diagram illustrating a timing sequence of the system shown in FIG. 7A, in accordance with the present disclosure.

FIG. 7B is a schematic timing diagram illustrating a timing sequence 750 of the system shown in FIG. 7A. Generally, in operation, backlight provides continuous illumination 752 through alternate left eye image frame and right eye image frame display cycles 755, 757 respectively. In an exemplary left eye image display cycle 755, data lines are addressed 754 in a modulation region on the LC modulating panel 704 with left eye image data 755. When a portion of the lines in the modulation region display a predetermined portion of the left eye image frame, polarization control instructions are provided to the polarization control segment associated with the modulation region to operate in a left eye polarization display mode, thereby switching 756 the polarization control segment to operate in a left eye polarization display mode.

Generally, a right eye image display cycle 757 works in a similar manner. For example, data lines are addressed 754 in a modulation region on the LC modulating panel 704 with right eye image data 757. When a portion of the lines in the modulation region display a predetermined portion of the right eye image frame, polarization control instructions are provided to the polarization control segment associated with the modulation region to operate in a right eye polarization display mode, thereby switching 756 the polarization control segment to operate in a right eye polarization display mode.

In an embodiment, an optimum time for switching the PCP 756 segment is when an LCD line centered within the modulation region is at least partially settled 759. In another embodiment, an optimum time for switching the PCP 756 is when the LCD line centered within the modulation region displays a predetermined portion of around half right and around half left eye image data. However, in another embodiment, the predetermined portion of the lines in the modulation region may be in the range of 40/60% to 60/40% left/right ratio.

As may be seen from the timing diagram 750, right eye data 757 is illustratively displayed on the first data line during period 758. Prior to the right eye data 757 being displayed on the first line during period 758, polarization control instructions may control (i.e., switch 756) the polarization control segment associated with the first data line of the associated LC modulation region.

By way of example, after switching 756 a polarization control segment to operate in the left eye polarization display mode, the SOP transformation for that polarization control segment is maintained until the polarization control segment is switched to the right eye polarization display mode. At a 120 Hz frame rate, an entire left eye image frame or right eye image frame is addressed 754 within 1/120 second.

In an embodiment, a settling time 759 of the LC 704 for a middle data line of the modulation region and the switching time 756 of the PCP 706 for the associated polarization control segment may be optimized for negligible left and right eye cross-talk when viewing the stereoscopic imagery through left and right eye analyzers.

Generally, adjacent segmented polarization control segments are sequentially scrolled on the PCP. The scrolling direction is described herein as from top to bottom, but it should be appreciated that this is a non-limiting description, and that the scrolling direction can be from bottom to top. Further the scrolling may be performed in groups of segments, such that several groups of segments can be addressed at once. The principles taught herein may be applied to such grouping of multi-segmented driving.

DC Balancing

Figure 8:
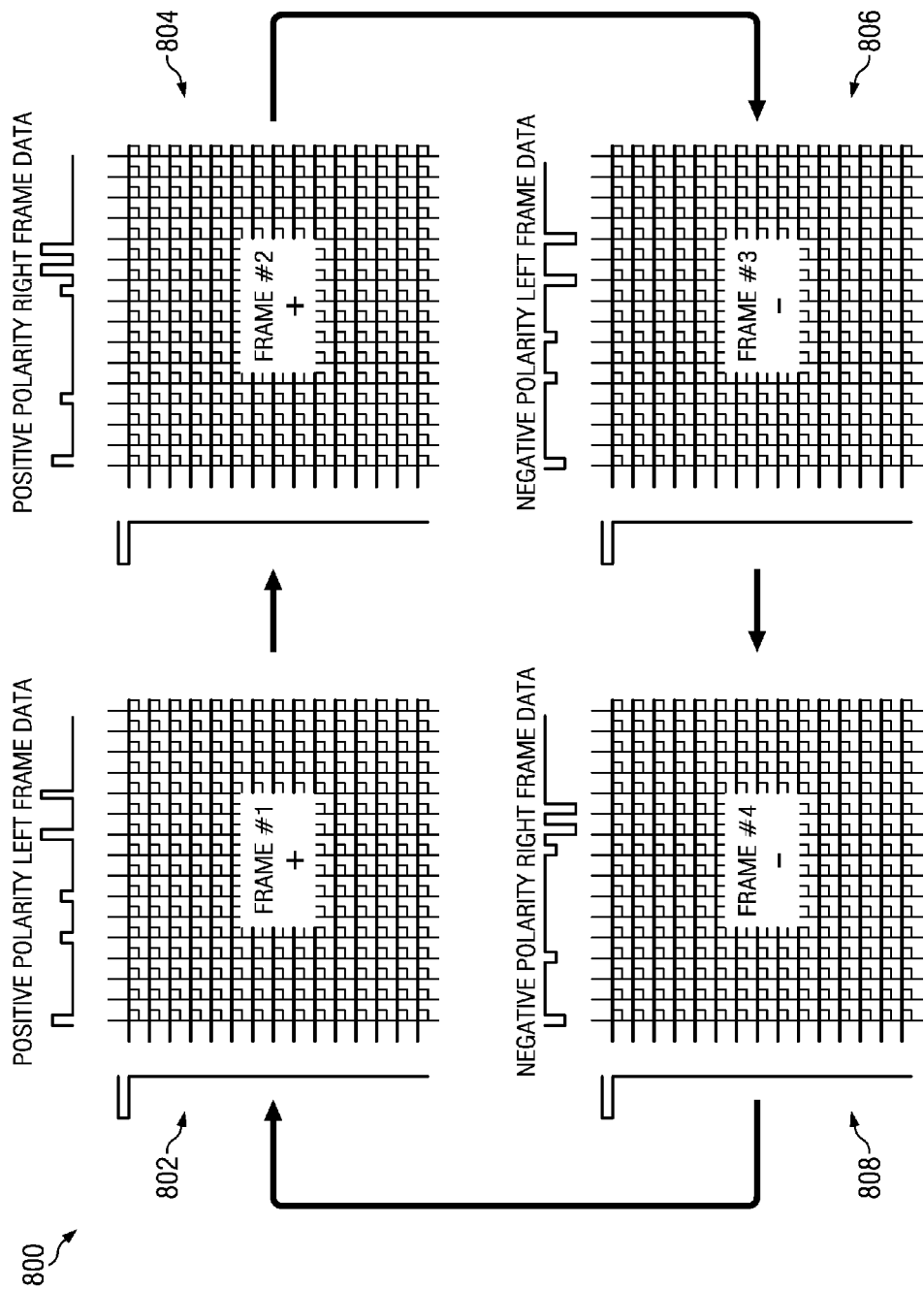
FIG. 8 is a schematic diagram illustrating a DC balancing approach for LC display panels, in accordance with the present disclosure.

FIG. 8 is a schematic diagram illustrating a DC balancing approach 800 for LC display panels. With the exception of the example in FIGS. 5A and 5B, the system embodiments herein generally provide for the displaying of alternate left and right eye images. This may cause a problem with the dc balancing of the liquid crystal drive scheme. Conventional LC addressing alternate between frames the polarity of the applied LC addressing voltage to perform the dc balancing. If a single polarity were used, the electric field across the LC may cause ion migration and alteration of its electro-optic characteristics. The result would be the characteristic 'image sticking' phenomenon where pervious frames become visible as a ghost. Alternating the polarity between frames does a good job of dc balancing as the correlation between successive frames of a 2D image sequence is high and the time average field across any liquid crystal pixel equates very closely to zero. This however is not the case for stereoscopic content where alternate and not successive frames are correlated. To effectively avoid problems with dc balancing, the addressing polarity for successive right or left eye images may be altered. In the above system embodiments (barring those described in FIGS. 5A & 5B), this means that the polarity may be altered every other frame as shown in FIG. 8.

An exemplary embodiment is provided with reference to the sequence 800, illustrating a simplified addressing grid for a LC modulating panel. In a first frame (frame #1), showing left-eye content, the polarity of the addressing drive scheme is positive. In a second frame (frame #2), showing right-eye content, the polarity of the addressing drive scheme remains positive. In a third frame (frame #3), switching to left-eye content, the polarity of the addressing drive scheme is altered to negative polarity. In a fourth frame (frame #4), showing right-eye content, the polarity of the addressing drive scheme is remains negative polarity. And then the cycle continues, such as the following frame shows left-eye content with positive polarity addressing, and so on.

This concept of dc balancing can be extended to stereoscopic flat panel displays including those that might display more than two image sequences or views. In any particular case, toggling the polarity of the drive voltage between successive view images may perform adequate dc balancing.

Improved Segmented Polarization Control Panel

Figure 9:
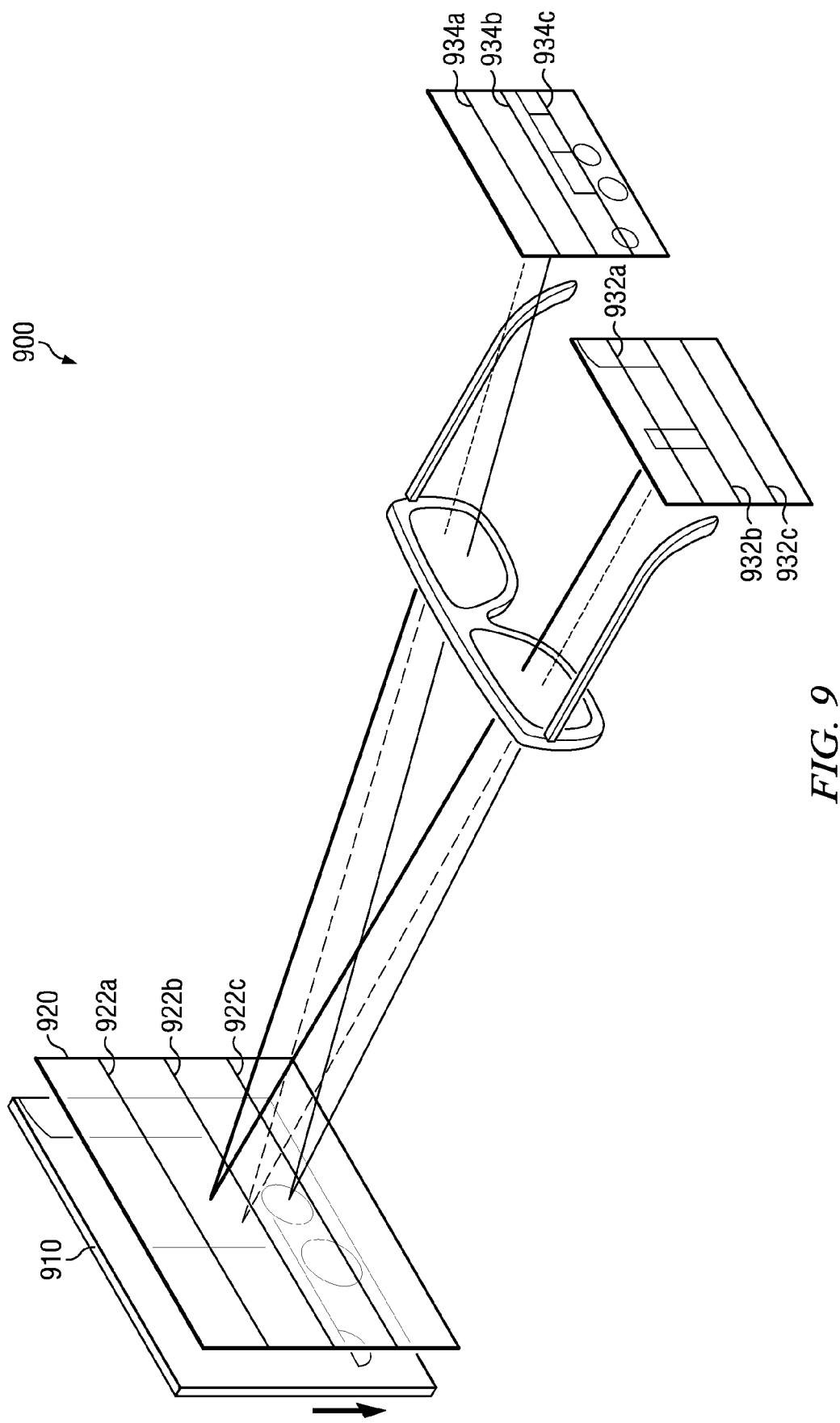
FIG. 9 is a schematic diagram of an exemplary PCP for a stereoscopic display having a plurality of polarization control segments, in accordance with the present disclosure.

FIG. 9 is a schematic diagram of an exemplary polarization control panel 900 for a stereoscopic display having a plurality of polarization control segments, illustrating how a segmented or scrolling PCP 920 may be prone to visible segment boundaries. For example, boundaries 922a, 922b, and 922c may be visible in the left-eye view as 932a, 932b, 932c and right-eye view 934a, 934b, 934c, as shown. Such systems employing scrolling PCPs are prone to visible segment boundaries, since in general, the LC at the boundaries does not switch with the rest of the PCP LC.

Figure 10A:
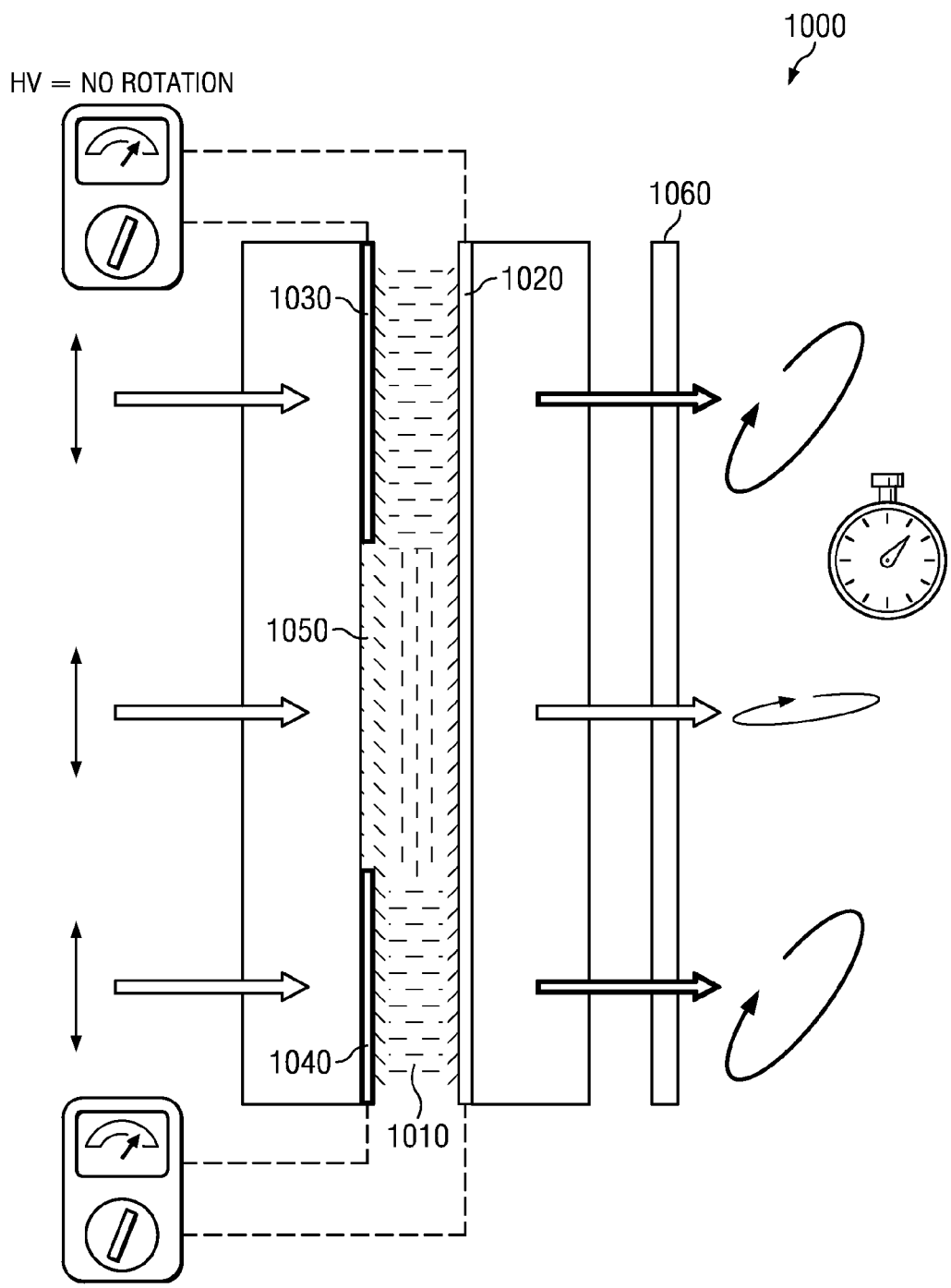
FIGS. 10A, 10B, and 10C are schematic diagrams illustrating cross-sectional views of a segmented PCP.
Figure 10B:
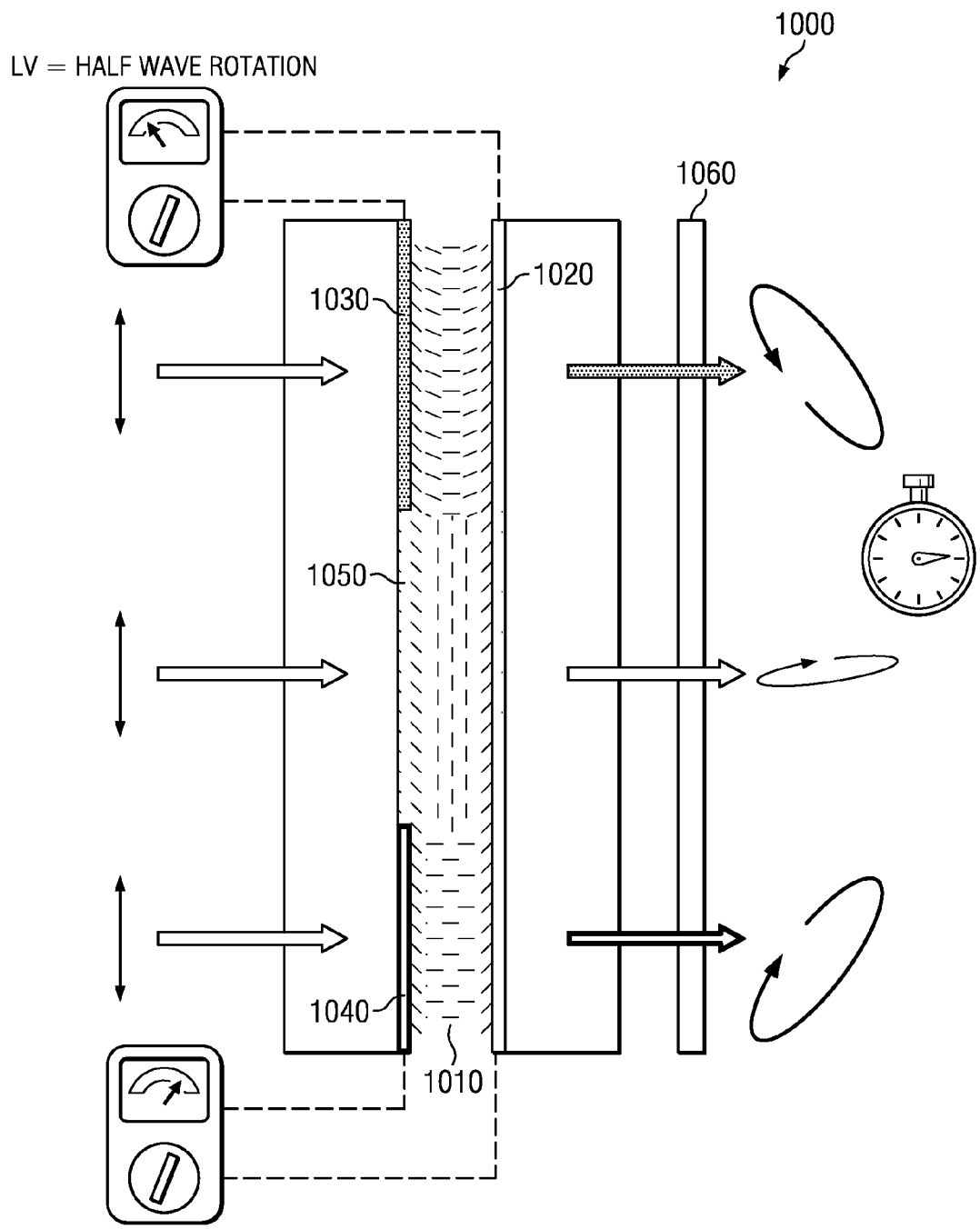
Figure 10C:
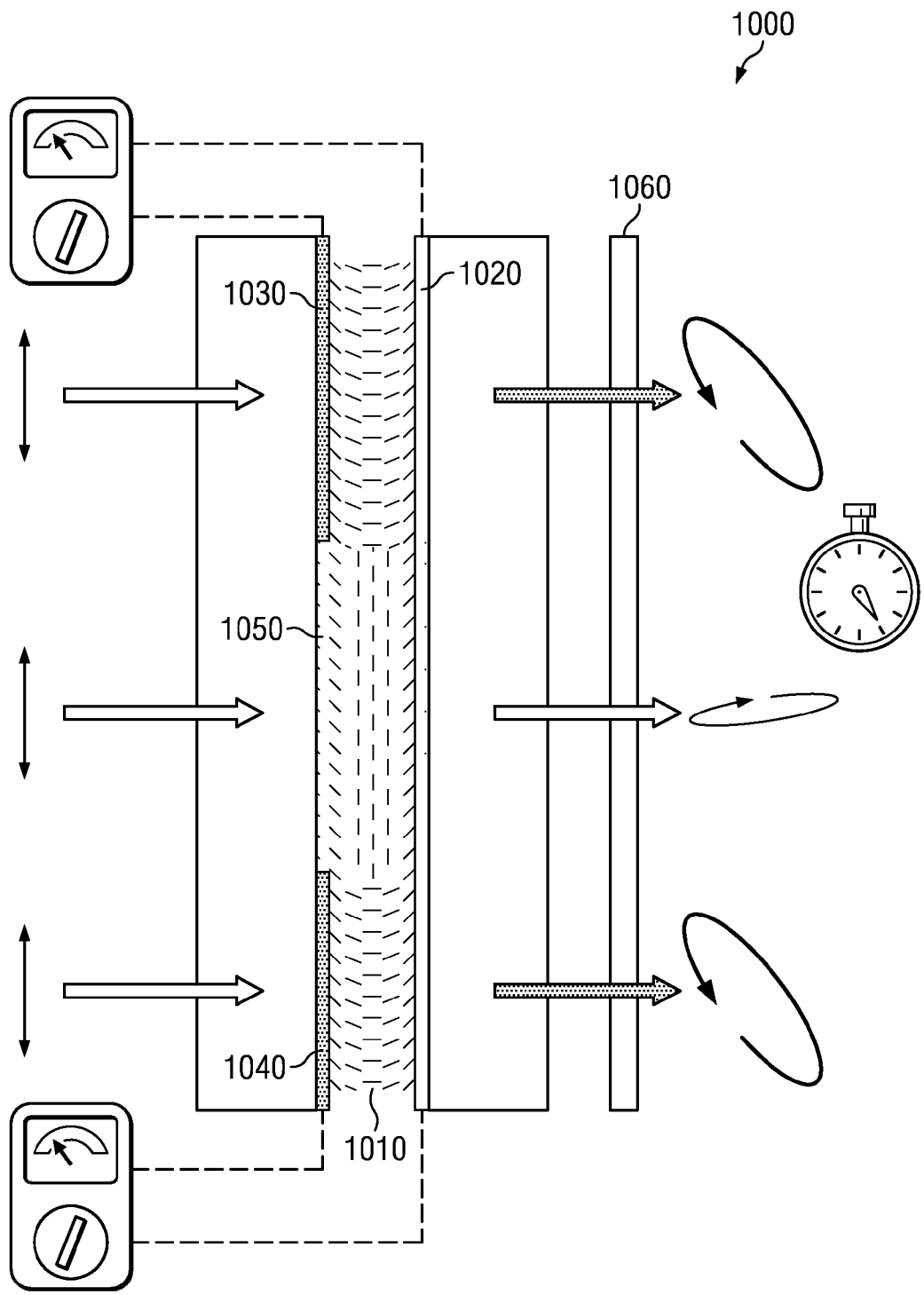

FIGS. 10A-C are schematic diagrams showing a cross section of a polarization control panel 1000 for a stereoscopic display having a plurality of polarization control segments, illustrating the cross section at a boundary between polarization control segments. The structures shown in FIG. 10A-C is typical of an LC modulator with a continuous common electrode on one side and a patterned structure on the other.

A polarization control panel (PCP) 1000 for a stereoscopic display is operable to selectively transform the state of polarization of modulated light from an image modulation panel. The PCP 1000 has a plurality of polarization control segments. As shown, the PCP 1000 includes a liquid crystal (LC) layer 1010 disposed on a first plane, a common electrode 1020 disposed on a first side of the LC layer 1010, and parallel to the first plane, a first electrode 1030 disposed on a second side of the LC layer, on a second plane that is parallel to the first plane, and a second electrode 1040 disposed on the second side of the LC layer, on the second plane. There is a gap 1050 between the first electrode 1030 and the second electrode 1040.

In this example the electrodes, e.g., first electrode 1030, second electrode 1040, third electrode (not shown), et cetera, may each form thick (about 1 cm) horizontal stripes. The electrodes 1030 and 1040 may include a transparent conductive oxide such as indium tin oxide (ITO). The gap 1050 between the electrodes 1030, 1040 may be small, but lithography or equivalent methods of patterning the ITO electrodes may only attain modest gap widths (about 20 um) over such large area substrates. The effect of this gap is to allow unswitched LC lines to exist which may be clearly visible. The scrolling driving sequence of FIGS. 10A-C illustrate the 'dead' region from gap 1050. Regardless of the state of the adjacent stripes, the gap LC 1050 polarizes the light in an uncontrolled manner allowing each eye to see continuous leakage. If the gap 1050 between the drive electrodes 1030, 1040 is small, their visibility is reduced, but to remove them altogether, the LC may be driven with the surrounding segments in such a manner as to avoid shorting the electrodes.

Figure 11A:
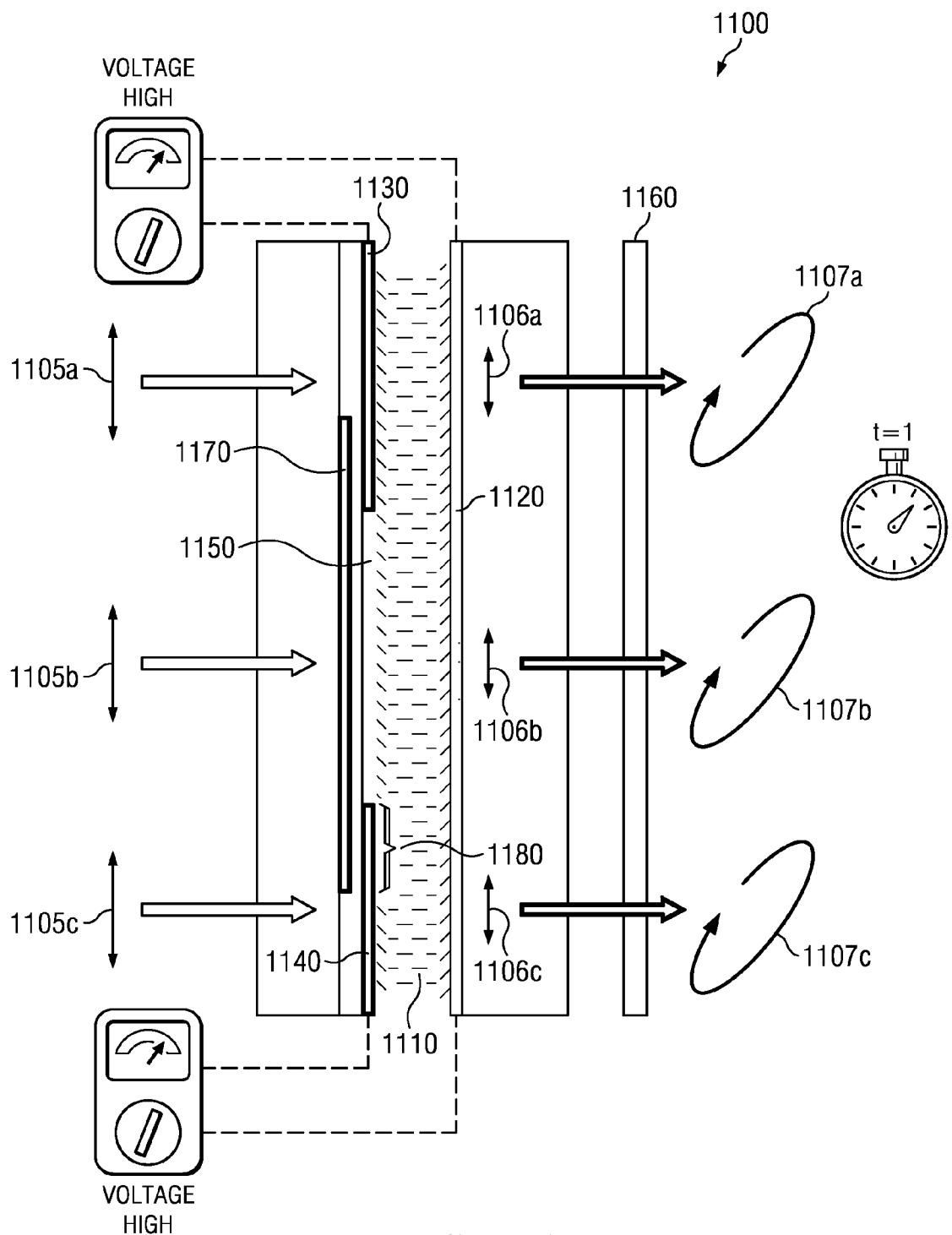
FIGS. 11A, 11B, and 11C are schematic diagram illustrating cross-sectional views of an improved segmented PCP, in accordance with the present disclosure.
Figure 11B:
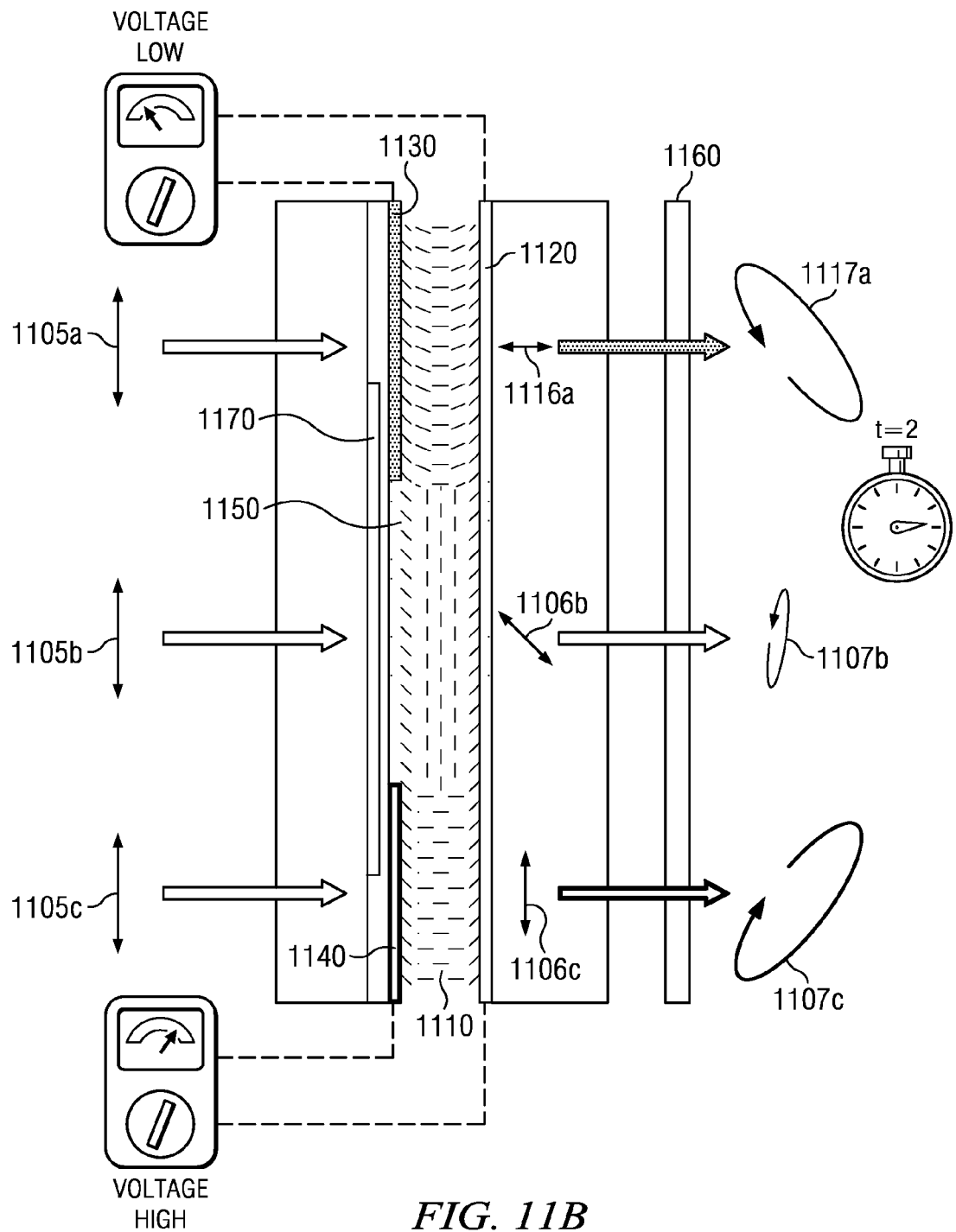
Figure 11C:
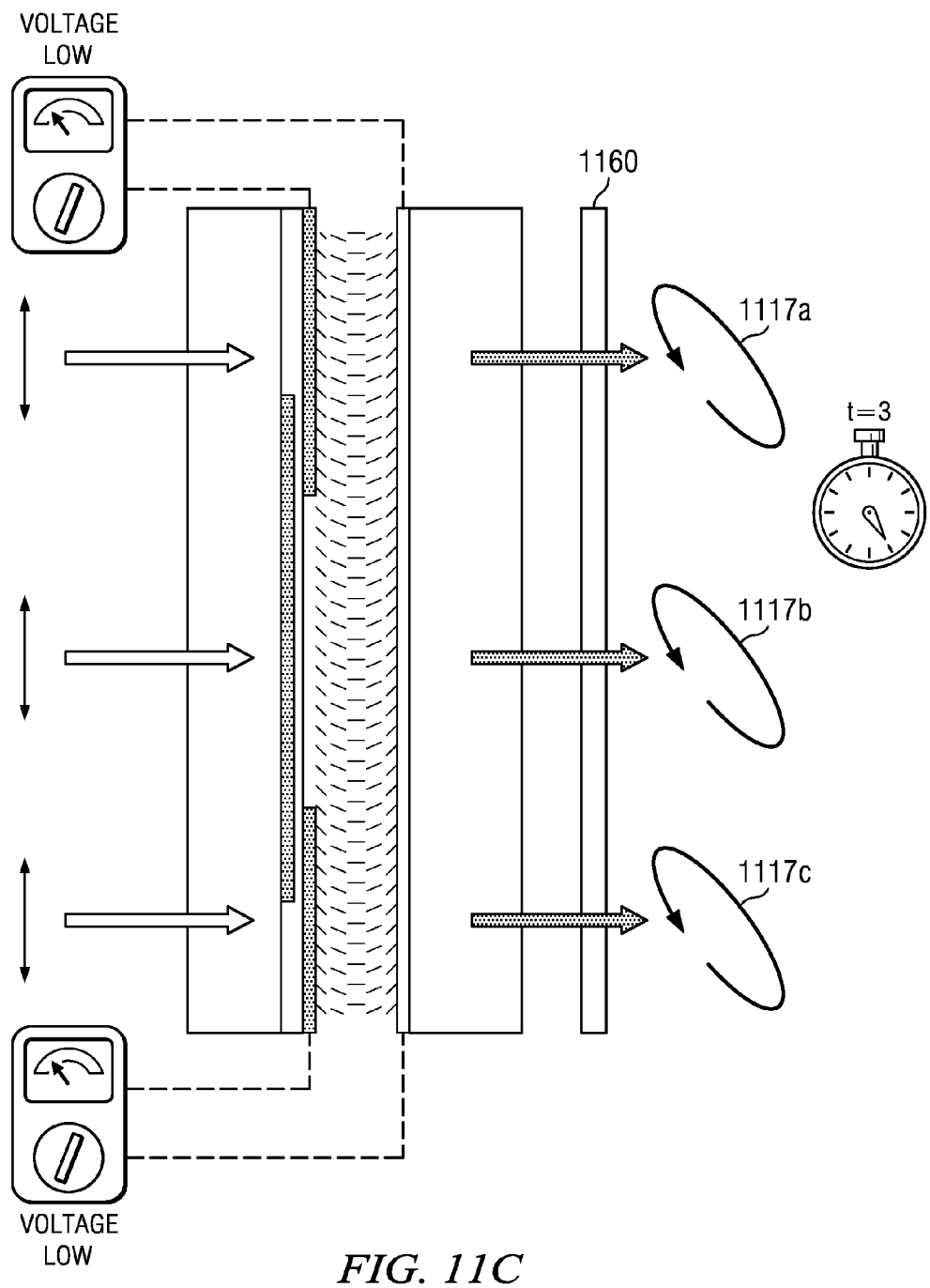

FIGS. 11A-C are schematic diagrams showing a cross section of an improved segmented polarization control panel 1100 for a stereoscopic display having a plurality of polarization control segments, illustrating the cross section at a boundary between polarization control segments.

A solution to the shortcomings of the embodiment described in FIG. 10A-C is shown in FIG. 11A where buried electrode 1170 covering the gap region 1150 are capacitively coupled to one or both adjacent addressing electrodes. As shown in FIG. 11A, a polarization control panel (PCP) for a stereoscopic display 1100 is operable to transform the state of polarization of modulated light 1105 from an image modulation panel (not shown), the PCP having a plurality of polarization control segments 1130, 1140. The PCP 1100 may include a liquid crystal (LC) layer 1110, a common electrode layer 1120 disposed on a first side of the LC layer 1110, a first electrode 1130 disposed on a second side of the LC layer 1110, a second electrode 1140 disposed on the second side of the LC layer 1110, and an intermediate electrode 1170 disposed on the second side of the LC layer 1110 and overlapping a portion of the first electrode 1130 and the second electrode 1140. The PCP may further include a quarter wave plate 1160 in an output optical path. In some embodiments, the LC layer 1110 may include zero twist nematic liquid crystal material having zero retardation in a first state and a half wave of retardation in a second state.

As may be seen in this exemplary embodiment, the LC layer 1110 may be disposed on a first plane, wherein the common electrode 1120 is parallel to the first plane, wherein the first and second electrodes 1130, 1140 are on a second plane that is parallel to the first plane, and where an intermediate electrode 1170 is on a third plane that is parallel to the first plane. In some embodiments, a portion 1180 of the second electrode 1140 may overlap and be conductively isolated from the intermediate electrode 1170. In some embodiments, the first electrode 1130 and the intermediate electrode 1170 may be electrically coupled such that a portion 1180 of the second electrode 1170 overlaps the second electrode 1140.

Referring to the operation at a first time instance (t=1), illustrated in FIG. 11A, the first electrode 1130 and the common electrode 1120 may be selectively driven with a voltage high (corresponding to the first state) or a voltage low voltage potential (corresponding to the second state). When driven with the voltage high potential, the LC layer 1110 allows light 1105a to pass through with zero retardation. The quarter wave plate 1160 in the output optical path operates to convert the linearly polarized light 1106a to clockwise circularly-polarized light 1107a. When driven with the voltage low potential, the LC layer 1110 transforms light 1105a by a half wavelength at a particular design wavelength (e.g., the middle of the visible spectrum at 545 nm). In a similar manner, the second electrode 1140 may be selectively driven with a voltage high or a voltage low voltage potential. As shown in FIG. 11A, similar to the above description, the second electrode is driven with a voltage high potential to output clockwise circularly-polarized light 1107c. Since both the first and second electrodes 1130, 1140 are being driven at a voltage high potential, intermediate electrode 1170 (which may be directly connected to first electrode 1130 in an embodiment, or capacitively coupled to the first electrode 1130 in another embodiment, or capacitively coupled to both the first and second electrodes, 1130, 1140 in another embodiment) also is at the voltage high potential with respect to the common electrode 1120. Accordingly, the liquid crystal material in the gap 1150 is operable to allow light 1106b to pass without retardation in the voltage high state, such that output light following the quarter wave plate 1160 is also clockwise circularly-polarized light 1107b.

Referring to the operation at a second time instance (t=2), illustrated in FIG. 11B, there is a voltage low potential across first electrode 1130 and the common electrode 1120 (corresponding to the second state), and there is a voltage high potential across the second electrode 1140 and the common electrode 1120 (corresponding to the first state). In such operation, the lower polarization control segment and quarter wave plate collectively operates to output clockwise circularly-polarized light 1107c, consistent with the description above. However, the upper polarization control segment and quarter wave plate 1160 collectively operate to output counter-clockwise circularly-polarized light 1117a, when a voltage low potential is applied across first electrode 1130 and common electrode 1120. Since the first and second electrodes 1130, 1140 are driven differently, the intermediate electrode 1170 takes on a substantially intermediate voltage while preventing the flow of dc current which would cause undesirable heating and energy loss.

In the case where similar voltages are applied to the first and second electrodes 1130, 1140, the intermediate electrode 1170 follows suit and drives the gap LC 1150 into a similar modulating state. For example, referring to the operation at a third time instance (t=3), illustrated in FIG. 11C, there is a voltage low potential across both first and second electrodes 1130, 1140 and the common electrode 1120 (corresponding to the second state). In such operation, the intermediate electrode the intermediate electrode follows an average of drive electrode voltages between the first and second electrodes 1130, 1140, and drives the gap LC 1150 into a similar polarization control state. Accordingly, output light following the quarter wave plate 1160 is also counter-clockwise circularly-polarized light 1117a, 1117b, 1117c.

The disclosed technique of 'hiding' gaps between patterned ITO electrodes can be extended to any PCP element used in any direct or projected imaging system for 3D or other purposes. As such, it is not limited to the disclosed combination of a zero-twist nematic LC panel with a quarter-wave plate. Using the same principles, the disclosed technique may be applied to push-pull LC cell polarization modulators (e.g., pi-cells). By non-limiting example, such other PCP techniques are disclosed as taught in commonly-owned U.S. Pat. No. 6,975,345 to Lipton et al., or other polarization modulators, such as U.S. Pat. No. 7,528,906 to Mike Robinson, herein incorporated by reference.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

The scrolling, addressing, updating, transitioning, changing, etc. directions are described herein as from top to bottom, but it should be appreciated that this is a non-limiting description, and that these directions may be from bottom to top (or even left to right or right to left). Further the scrolling, addressing, updating, transitioning, changing, etc. may be performed in groups of segments, lines, portions, areas, etc., such that several groups of can be addressed at once. The principles taught herein may be applied to such grouping of multi-segmented driving.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A flat panel display operable to display stereoscopic imagery, comprising:
   a backlight operable to selectively provide light;
   a liquid crystal (LC) modulation panel positioned to receive the light incident from the backlight and operable to modulate the light incident from the backlight; and
   a polarization control panel (PCP) positioned to receive the modulated light incident from the LC modulation panel and operable to selectively transform the state of polarization (SOP) of the modulated light incident from the LC modulation panel in synchronization with the backlight and LC modulation panel;
   wherein the flat panel display has at least two operating states, comprising:
      a presentation state in which the backlight provides light to the LC modulation panel, in which the PCP operates in one of a right-eye polarization mode and a left-eye polarization mode, wherein when the PCP operates in the left-eye polarization mode the LC modulation panel operates in a left-eye image mode, and wherein when the PCP operates in the right-eye polarization mode the LC modulation panel operates in a right-eye image mode; and
      a transition state in which the backlight does not provide light to substantially any portion of the LC modulation panel when the LC modulation panel changes between the left-eye and right-eye image modes, and when the PCP transitions between the left-eye and the right-eye polarization modes;
   wherein the right-eye polarization mode comprises altering the light to circularly polarized light capable of being analyzed by a right-eye analyzer.

2. The flat panel display of claim 1, wherein in the presentation state, the PCP is operating in the right-eye polarization mode, and the LC modulation panel operates in the right-eye image mode;
   and wherein in the transition state, the PCP is transitioning from the right-eye to the left-eye polarization mode, and the LC modulation panel is changing from the right-eye to the left-eye image mode.

3. The flat panel display of claim 1, wherein in the presentation state, the PCP is operating in the left-eye polarization mode, and the LC modulation panel operates in the left-eye image mode;
   and wherein in the transition state, the PCP is transitioning from the left-eye to the right-eye polarization mode, and the LC modulation panel is changing from left-eye to right-eye image mode.

4. The flat panel display of claim 1, wherein the right-eye polarization mode comprises altering the light to linearly polarized light capable of being analyzed by a right-eye analyzer.

5. The flat panel display of claim 1, wherein the backlight is a globally modulated backlight unit.

6. The flat panel display of claim 1, wherein the PCP is a globally addressed PCP.

7. The flat panel display of claim 1, wherein the transition state comprises a time period equal to or greater than a settling time period associated with at least one of an LC modulation panel addressing time period and a PCP settling period.

8. The flat panel display of claim 1, wherein the presentation state comprises a 25% duty cycle.

9. The flat panel display of claim 1, wherein the transition state comprises a 75% duty cycle.

10. The flat panel display of claim 1, wherein when the PCP operates in the right-eye polarization mode, the SOP of the modulated light incident from the LC modulation panel is transformed such that a left-eye analyzer would block the transformed, modulated light output by the PCP.

11. The flat panel display of claim 1, wherein the right-eye image mode comprises a mode in which the LC modulation panel has a majority of settled data lines displaying right-eye image content.

12. A flat panel display operable to display stereoscopic imagery, comprising:
   a backlight operable to selectively provide light;
   a liquid crystal (LC) modulation panel positioned to receive the light incident from the backlight and operable to modulate the light incident from the backlight; and
   a polarization control panel (PCP) positioned to receive the modulated light incident from the LC modulation panel and operable to selectively transform the state of polarization (SOP) of the modulated light incident from the LC modulation panel in synchronization with the backlight and LC modulation panel;
   wherein the flat panel display has at least two operating states, comprising:
      a presentation state in which the backlight provides light to the LC modulation panel, in which the PCP operates in one of a right-eye polarization mode and a left-eye polarization mode, wherein when the PCP operates in the left-eye polarization mode the LC modulation panel operates in a left-eye image mode, and wherein when the PCP operates in the right-eye polarization mode the LC modulation panel operates in a right-eye image mode; and
      a transition state in which the backlight does not provide light to substantially any portion of the LC modulation panel when the LC modulation panel changes between the left-eye and right-eye image modes, and when the PCP transitions between the left-eye and the right-eye polarization modes; and
   wherein the right-eye polarization mode comprises a mode in which the PCP transforms the SOP of the modulated light into opposite handed circular polarized light for a certain design wavelength, and wherein the left-eye polarization mode comprises a mode in which the PCP transforms the SOP of the modulated light into opposite handed circular polarized light for the certain design wavelength.

13. A method for displaying stereoscopic imagery on a flat panel display having a backlight, a liquid crystal (LC) modulation panel and a polarization control panel (PCP), the method comprising:
   presenting stereoscopic imagery in a presentation state comprising:
      providing light from the backlight to the LC modulation panel;
      providing modulated light from the LC modulation panel to the PCP;

operating the PCP in one of a right-eye polarization mode and a left-eye polarization mode, wherein when the PCP operates in the left-eye polarization mode the LC modulation panel operates in a left-eye image mode, and wherein when the PCP operates in the right-eye polarization mode the LC modulation panel operates in a right-eye image mode; and transitioning between left-eye and right-eye views in a transition state comprising:

not providing light from the backlight to substantially any portion of the LC modulation panel when the LC modulation panel changes between the left-eye and right-eye image modes, and when the PCP transitions between the left-eye and the right-eye polarization modes;

wherein operating the PCP in the right-eye polarization mode comprises altering the light to linearly polarized light capable of being analyzed by a right-eye analyzer.

14. The method of claim 13, wherein in the presentation state, the PCP is operating in the right-eye polarization mode, and the LC modulation is operating in the right-eye image mode;

and wherein in the transition state, the PCP is transitioning from the right-eye to the left-eye polarization mode, and the LC modulation panel is changing from the right-eye to the left-eye image mode.

15. The method of claim 13, wherein in the presentation state, the PCP is operating in the left-eye polarization mode, and the LC modulation panel is operating in the left-eye image mode;

and wherein in the transition state, the PCP is transitioning from the left-eye to the right-eye polarization mode, and the LC modulation panel is changing from the left-eye to the right eye image mode.

16. The method of claim 13, wherein operating the PCP in the right-eye polarization mode comprises altering the light to linearly polarized light capable of being analyzed by a right-eye analyzer.

17. The method of claim 13, wherein transitioning between left-eye and right-eye views in the transition state further comprises transitioning over a time period equal to or greater than a settling time period associated with at least one of a LC modulation panel addressing time period and a PCP settling time period.

18. The method of claim 13, presenting stereoscopic imagery in the presentation state further comprises a 25% duty cycle.

19. The method of claim 13, wherein transitioning between left-eye and right-eye views in the transition state comprises a 75% duty cycle.

20. The method of claim 13, wherein operating the PCP in the right-eye polarization mode comprises transforming the SOP of the modulated light incident from the LC modulation panel such that a left-eye analyzer would block the transformed, modulated light output by the PCP.

* * * * *